(12) United States Patent
Matsuura

(10) Patent No.: US 9,446,304 B2
(45) Date of Patent: Sep. 20, 2016

(54) IMAGE PROCESSING PROGRAM, IMAGE PROCESSING DEVICE AND IMAGE PROCESSING METHOD

(71) Applicant: SQUARE ENIX CO., LTD., Tokyo (JP)

(72) Inventor: Michio Matsuura, Osaka (JP)

(73) Assignee: SQUARE ENIX CO., LTD., Tokyo (JP)

( * ) Notice: Subject to any disclaimer, the term of this patent is extended or adjusted under 35 U.S.C. 154(b) by 49 days.

(21) Appl. No.: 14/211,472

(22) Filed: Mar. 14, 2014

(65) Prior Publication Data

US 2015/0031450 A1    Jan. 29, 2015

(30) Foreign Application Priority Data

Jul. 25, 2013   (JP) ................................ 2013-154423

(51) Int. Cl.
| | |
|---|---|
| A63F 9/24 | (2006.01) |
| A63F 13/00 | (2014.01) |
| G06F 17/00 | (2006.01) |
| G06F 19/00 | (2011.01) |
| A63F 13/5258 | (2014.01) |
| A63F 13/822 | (2014.01) |

(52) U.S. Cl.
CPC ........... *A63F 13/00* (2013.01); *A63F 13/5258* (2014.09); *A63F 13/822* (2014.09)

(58) Field of Classification Search
CPC ............. A63F 13/525; A63F 13/5252; A63F 13/5255; A63F 13/5258
See application file for complete search history.

(56) References Cited

U.S. PATENT DOCUMENTS

| | | | |
|---|---|---|---|
| 6,165,073 A * | 12/2000 | Miyamoto | ............ A63F 13/10 463/1 |
| 6,320,582 B1 | 11/2001 | Yamamoto et al. | |
| 8,475,284 B1 | 7/2013 | Rudi et al. | |
| 2004/0209684 A1 | 10/2004 | Hisano | |
| 2005/0009602 A1 | 1/2005 | Nishimura | |
| 2010/0069152 A1 | 3/2010 | Nishimura et al. | |
| 2011/0207532 A1* | 8/2011 | Terada et al. | ................... 463/31 |
| 2014/0038708 A1* | 2/2014 | Davison et al. | ................ 463/31 |

FOREIGN PATENT DOCUMENTS

| | | |
|---|---|---|
| JP | 3871224 | 1/2007 |
| JP | 2010-068882 | 4/2010 |
| JP | 2012-100991 | 5/2012 |

OTHER PUBLICATIONS

AwesomeFaceProd, "Zelda: Ocarina of Time 3D," Dec. 10, 2012, https://www.youtube.com/watch?v=1EoO0uhePTw.*
Extended European Search Report (EESR) from European Patent Office (EPO) in European Patent Application No. 14160538.6, dated Jan. 26, 2015.

* cited by examiner

*Primary Examiner* — Kevin Y Kim
(74) *Attorney, Agent, or Firm* — Greenblum & Bernstein, P.L.C.

(57) ABSTRACT

To provide an image processing device and the like capable of improving visibility of images in a game and so on with respect to a user. A player object operated by the user and plural objects different from the player object are generated in a three dimensional virtual space, and an object existing within a given range including the player object in these plural objects is selected as an object to be imaged, and a position of a virtual camera is determined so that the player object and the object to be imaged are captured into the two dimensional image.

16 Claims, 24 Drawing Sheets

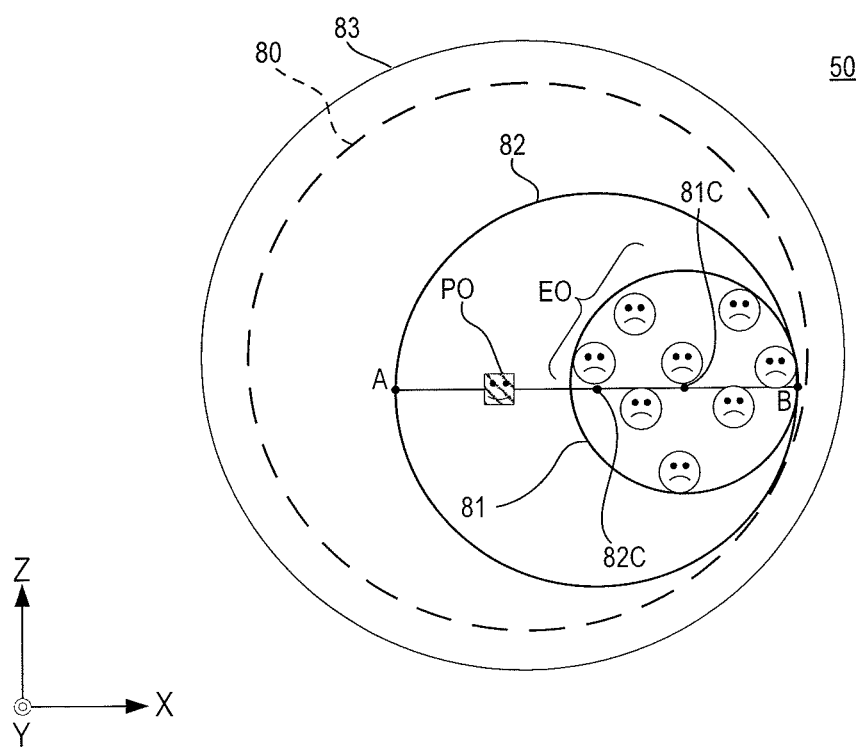

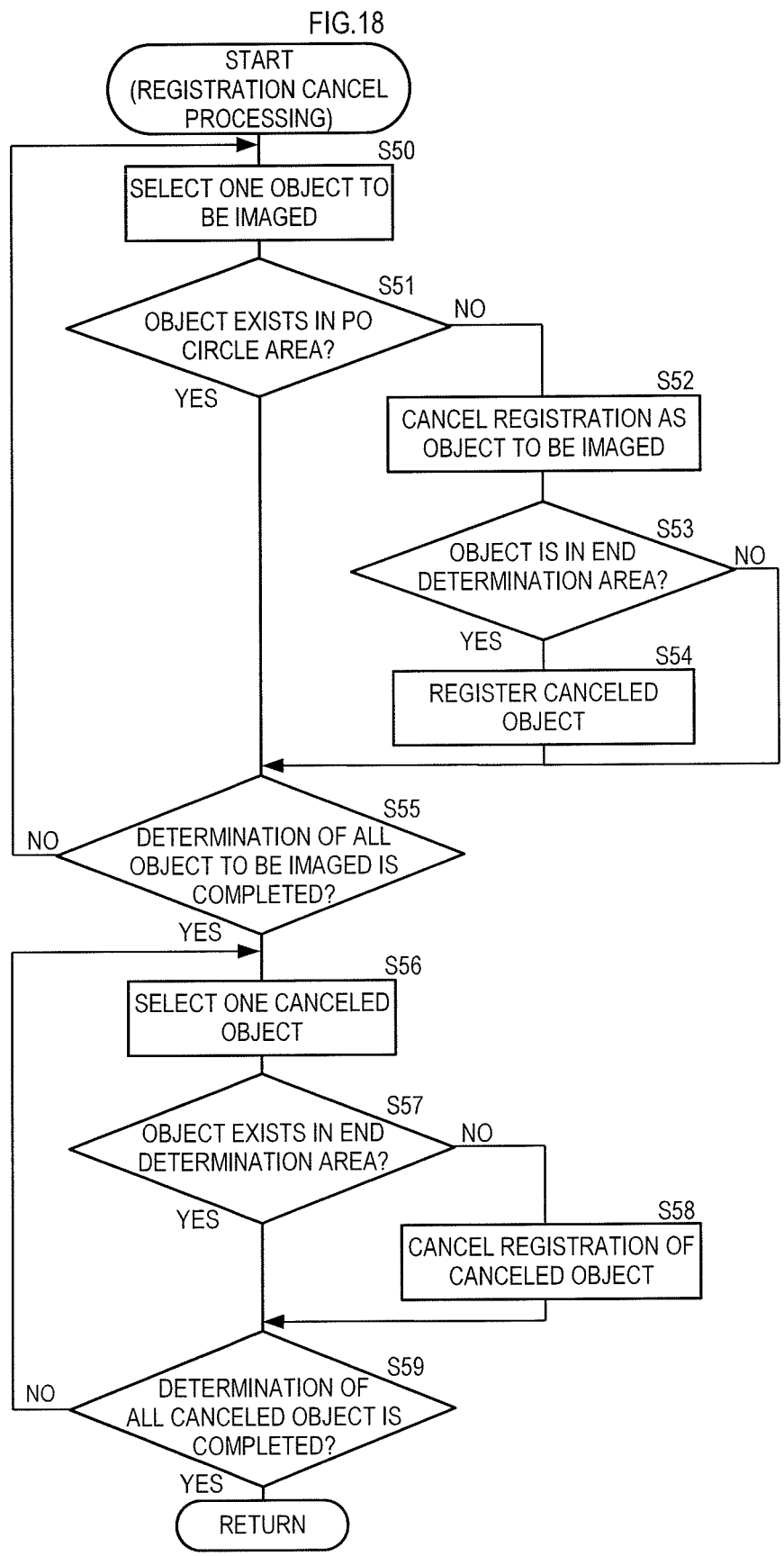

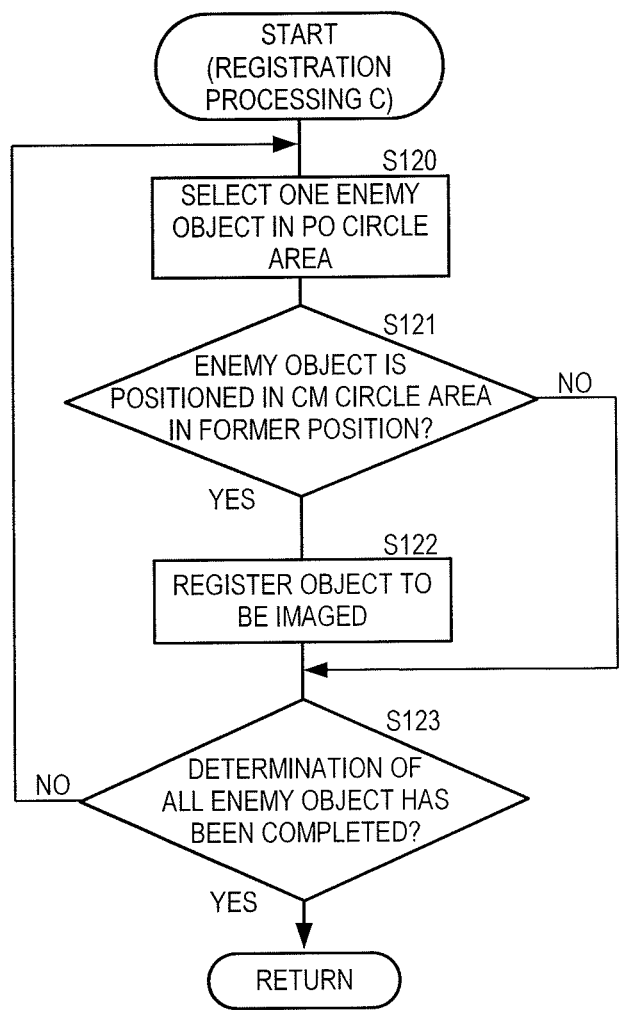

IMAGE PROCESSING PROGRAM, IMAGE PROCESSING DEVICE AND IMAGE PROCESSING METHOD

BACKGROUND OF THE INVENTION

1. Field of the Invention

The present invention relates to an image processing device and the like generating two dimensional images corresponding to a three dimensional virtual space by using a virtual camera.

2. Description of Related Art

A video game device executes a game and so on, for example, generating a player object operated by a user (player) and other objects in a three dimensional virtual space. The video game device also images a state of the three dimensional virtual space by a virtual camera and displays the state on a display device such as a monitor. The user operates the player object by using a game pad and so on while visually recognizing the state of the three dimensional virtual space (game status) displayed on the display.

In a related-art video game device, the virtual camera is controlled so as to be set at an upper rear position of the player object, and an image of the three dimensional virtual space is taken so that the player object is included.

There is also a video game device in which plural groups each including one or more enemy objects are arranged in the three dimensional virtual space, and an imaging direction of the virtual camera is controlled so that enemy objects of a group selected from the plural groups are captured into a two dimensional image (for example, refer to JP-A-2010-68882). Moreover, there is a video game device in which the position of the virtual camera is controlled in accordance with the number of enemy objects (for example, refer to Japanese Patent No. 3871224).

Furthermore, there is a video game device in which a horizontal angle of view of the virtual camera is controlled so that groups of objects are imaged in plural objects arranged in the three dimensional virtual space in demo-scene (for example, refer to JP-A-2012-100991).

The user desires to figure out in which state the player object and the enemy objects are from a game image quickly so as to play the game well. In particular, in the game in which the player object is displayed on the game image, the user desires to visually recognize positional relationship between the player object and the enemy objects. Especially in recent games, there is the one in which many enemy objects are generated in the three dimensional virtual space. Accordingly, it becomes important in which manner the three dimensional virtual space is imaged while including many objects.

SUMMARY OF THE INVENTION

However, in the above related-art video game device, positions of the player object or other objects and so on are considered in the control of positions of the virtual camera and so on, however, the positional relationship between the player object and the other plural objects is not considered. Therefore, the user sometimes feels uncomfortable in seeing the game image.

In view of the above, an object of the present invention is to provide an image processing program and so on capable of improving visibility of images of the game and so on with respect to the user.

In a non-limiting aspect, an image processing program according to the present invention allows a computer device as an image processing device generating a two dimensional image as an image of at least part of a three dimensional virtual space imaged by a virtual camera to function as a virtual camera controller for controlling the movement of the virtual camera in the three dimensional virtual space, and an object controller for generating a player object operated by a user through an operation unit and plural objects different from the player object in the three dimensional virtual space, and controlling the motion of the player object and the plural objects, in which the virtual camera controller selects an object existing within a given range including the player object from the plural objects as an object to be imaged, and determines a position of the virtual camera based on the positional relationship between the player object and the object to be imaged so that the player object and the object to be imaged are captured into the two dimensional image.

In another non-limiting aspect, an image processing device according to the present invention which generates a two dimensional image as an image of at least part of a three dimensional virtual space imaged by a virtual camera includes a virtual camera controller for controlling the movement of the virtual camera in the three dimensional virtual space, and an object controller for generating a player object operated by a user through an operation unit and plural objects different from the player object in the three dimensional virtual space, and controlling the motion of the player object and the plural objects, in which the virtual camera controller selects an object existing within a given range including the player object from the plural objects as an object to be imaged, and determines a position of the virtual camera based on the positional relationship between the player object and the object to be imaged so that the player object and the object to be imaged are captured into the two dimensional image.

In another non-limiting aspect, an image processing method according to the present invention which is executed by an image processing device generating a two dimensional image as an image of at least part of a three dimensional virtual space imaged by a virtual camera includes the steps of controlling the movement of the virtual camera in the three dimensional virtual space, and generating a player object operated by a user through an operation unit and plural objects different from the player object in the three dimensional virtual space, and controlling the motion of the player object and the plural objects, in which an object existing within a given range including the player object in the plural objects are selected as an object to be imaged, and a position of the virtual camera is determined based on the positional relationship between the player object and the object to be imaged so that the player object and the object to be imaged are captured into the two dimensional image in the step of controlling the movement of the virtual camera.

According to the present invention, the position of the virtual camera is controlled based on the positional relationship between the player object and the plural objects different from the player object. Therefore, it is possible to further improve visibility of images in a game and so on with respect to the user even in the three dimensional virtual space including the player object and plural objects.

BRIEF DESCRIPTION OF THE DRAWINGS

FIG. 14 is an explanatory view for explaining the positioning of the virtual camera by the execution of the battle camera control processing;

FIG. 18 is a flowchart showing registration cancel processing;

FIG. 22B is a flowchart showing registration processing C.

DESCRIPTION OF EMBODIMENTS

An image processing program and an image processing device according to an embodiment of a present invention will be explained with reference to the drawings. The configuration of the invention is not limited to the embodiment.

Figure 1:
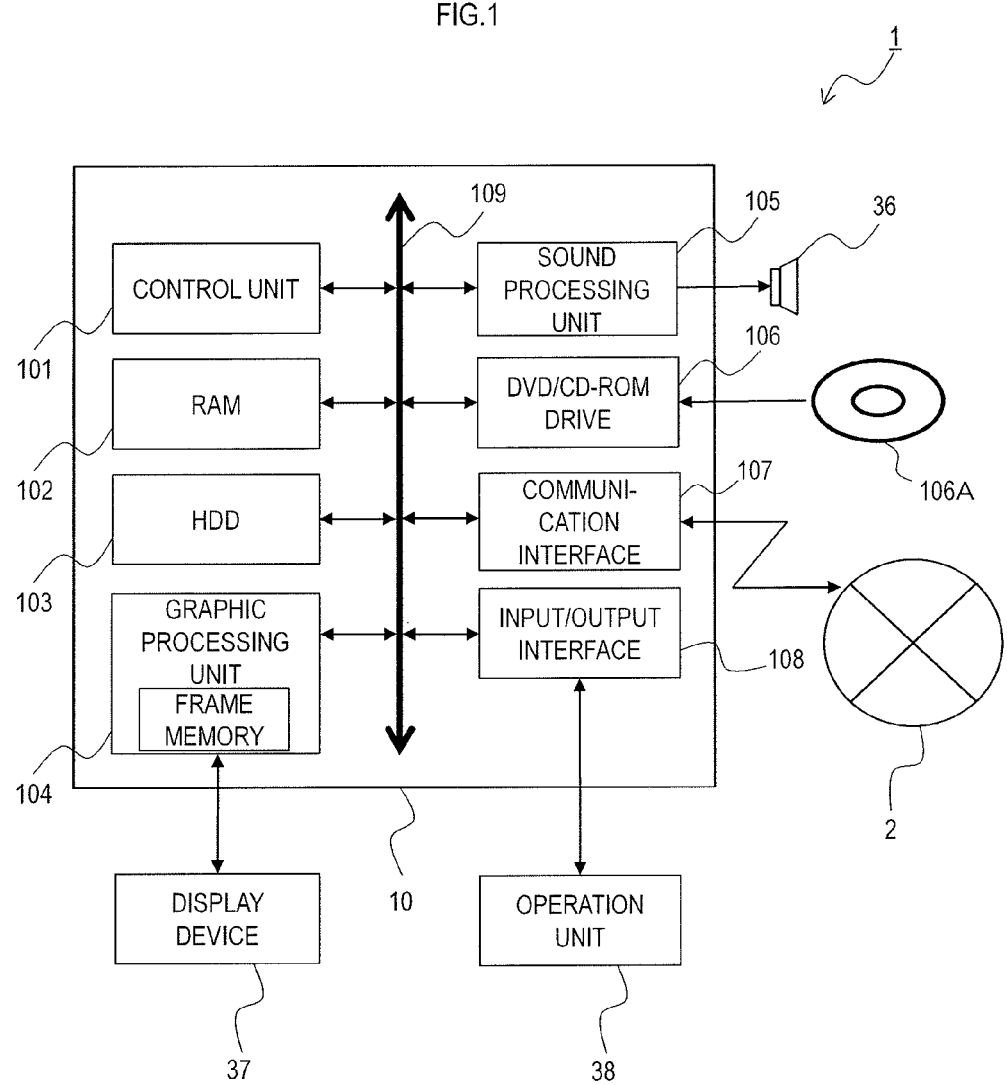
FIG. 1 is a block diagram of a game system including a game device according to a present invention.

FIG. 1 is a block diagram showing a game system 1 including a game device 10 according to the embodiment of the invention. The game system 1 includes the video game device 10, a sound output device 36, a display device 37, an operation unit 38, recording media 106A and so on.

The video game device 10 executes a given game by executing a game program recorded in the recording media 106A. In the embodiment, the game in which a player object and enemy objects exist in a game space as a three dimensional virtual space is executed. The video game device 10 corresponds to an image processing device to which the present invention is applied.

In this game, many enemy objects (for example, 100 bodies) appear in the game space. Then, the game is played by the user, for example, attacking enemy objects by operating the player object. The video game device 10 displays an image of part of the game space (game image) generated through a virtual camera on the display device 37. The video game device 10 also controls the movement of the virtual camera in the game space so that the player object and plural enemy objects are included in the game image. The details will be described later.

The video game device 10 includes a control unit 101, a RAM 102, an HDD 103, a graphic processing unit 104, a sound processing unit 105, a DVD/CD-ROM drive 106, recording media 106A, a communication interface 107, an input/output interface 108 and so on which are connected to an internal bus 109 as shown in FIG. 1.

The control unit 101 includes a CPU, a ROM and so on. The control unit 101 executes game programs stored in the HDD 103, the recording media 106A and so on, controlling the overall device. The RAM 102 is a volatile memory and a work area of the control unit 101. The HDD 103 is a storage area for storing game programs, data and so on.

The graphic processing unit 104 is connected to the display device 37 such as a monitor. The graphic processing unit 104 also includes a frame memory (frame buffer), generating images in the frame memory in units of frames (for example, 1/30 second) in accordance with a drawing instruction inputted from the control unit 101. Respective images generated in the frame memory are converted into a video signal and outputted to (displayed on) the display device 37.

The sound processing unit 105 is connected to the sound output device 36 as a speaker. The sound processing unit 105 outputs sound signals of sound effect, BGM and the like generated in accordance with a sound generating instruction transmitted from the control unit 101 to the sound output device 36.

The DVD/CD-ROM drive 106 reads game programs from the mounted recording media 106A to the RAM 102, the HDD 103 and so on. In the embodiment, a DVD-ROM and a CD-ROM represent the recording media 106A. The game programs are stored in the recording media 106A. The game program also includes game data such as graphic data and so on which is necessary for playing the game.

The communication interface 107 is connected to a network line 2, performing communication with another video game device 3. The input/output interface 108 is connected to the operation unit 38. The operation unit 38 is a game pad in which, for example, direction keys and plural operation buttons are provided, receiving operation inputs by the user. The user operates the player object, for example, by depressing the button of the operation unit 38. The input/output interface 108 outputs input data from the operation unit 38 to the RAM 102.

Then, the game device 10 functions as a virtual camera control unit and an object control unit by cooperation of the control unit 101 or the like and the game programs of the recording media 106A. The virtual camera control unit controls the movement of the virtual camera in the game space. The object control unit generates the player object and enemy objects in the game space. Furthermore, the object control unit controls the operation of these objects based on input data and so on from the operation unit 38.

Figure 2:
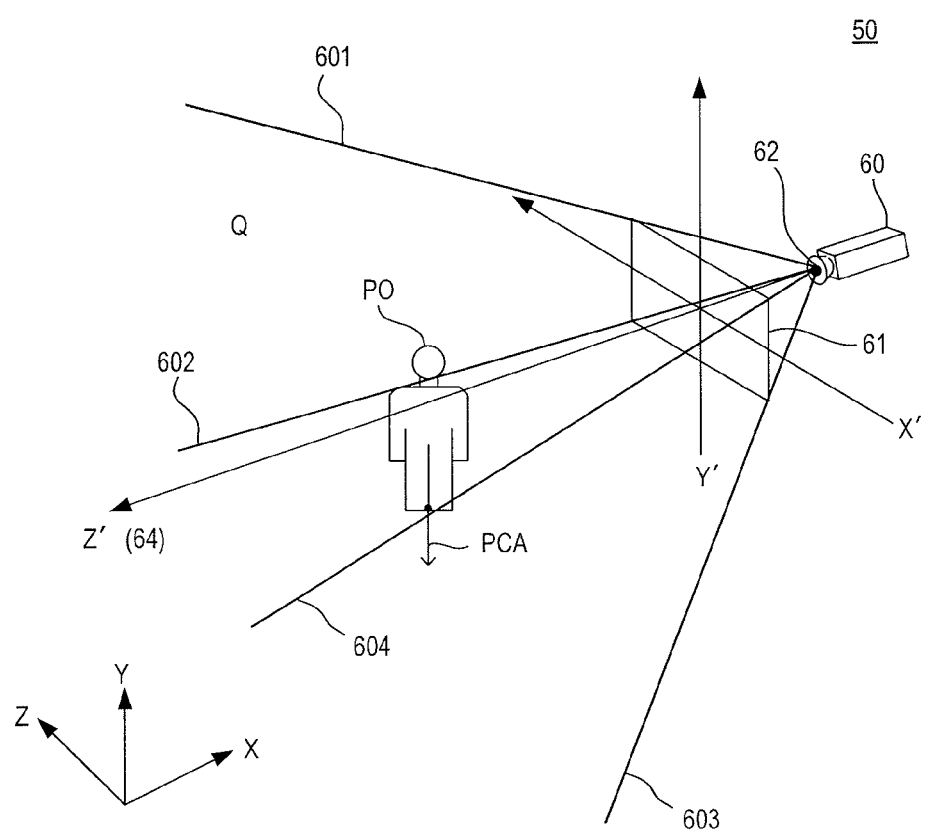
FIG. 2 is a view schematically showing a virtual camera and a virtual screen arranged in a game space.

FIG. 2 is a view schematically showing a virtual camera 60 and a virtual screen 61 arranged in a game space 50. In the game space 50 generated by the video game device 10, objects such as a player object PO and plural enemy objects (not shown) moving in the game space 50 exist as shown in FIG. 2. Additionally, objects which do not move such as buildings (not shown) also exist in the game space 50.

The virtual camera 60 is also arranged in the game space 50. The virtual camera 60 images part of the game space 50 for generating the game image to be displayed on the display device 37. The graphic processing unit 104 generates an image taken by the virtual camera 60 as the game image.

Specifically, the graphic processing unit 104 generates an image (two dimensional image) in which the game space is projected on the virtual screen 61 by setting the virtual camera 60 as a visual point 62 by performing well-known processing such as perspective transformation. Then, the game image is generated by combining an image of a cursor and the like with the image. The graphic processing unit 104 generates game images in units of frames. The technique concerning the generation of the game image using the above virtual camera 60 is well known, therefore, the detailed explanation is omitted.

The above game space 50 is defined by a world coordinate system including XYZ axes. Additionally, a coordinate system used for projecting the game space 50 on the virtual screen 61 is defined as a visual-point coordinate system including X'Y'Z' axes based on the visual point 62.

The position of the virtual camera 60 corresponds to the visual point 62 and the direction of the virtual camera 60 corresponds to a visual axis 64. The visual axis 64 corresponds to Z' axis of the visual-point coordinate system, which is determined by the position of the virtual camera 60 and a point of gaze (not shown). An area formed by four straight lines 601 to 604 connecting from the visual point 62 to apexes of the virtual screen 61 and the virtual screen 61 is a visual range Q. Note that the virtual screen 61 in the embodiment is arranged at a position at a given distance apart from the visual point 62 on the visual axis 64. Also in the embodiment, the size of the virtual screen 61 and the distance from the visual point 62 are fixed.

The position of the virtual camera 60 is determined by camera control processing. The camera control processing includes non-battle camera control processing and battle camera control processing. The non-battle camera control processing is executed when there is no enemy object around the player object PO. On the other hand, the battle camera control processing is executed when there exists an enemy object around the player object PO. These two camera control processing is alternatively performed mainly by the control unit 101.

Figure 3A:
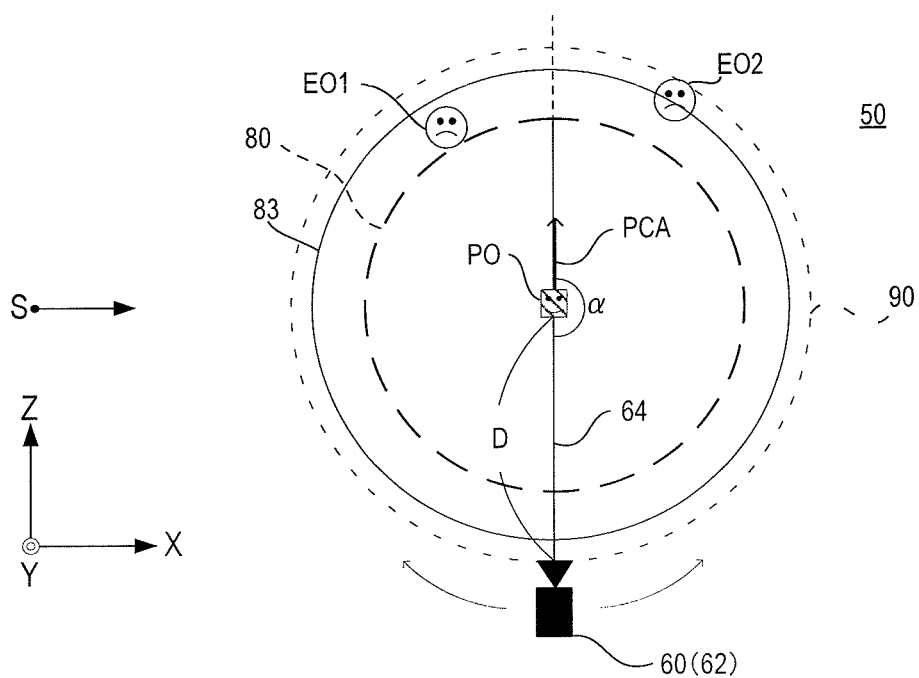
FIG. 3A is an explanatory view for explaining the positioning of the virtual camera by the execution of non-battle camera control processing.
Figure 3B:
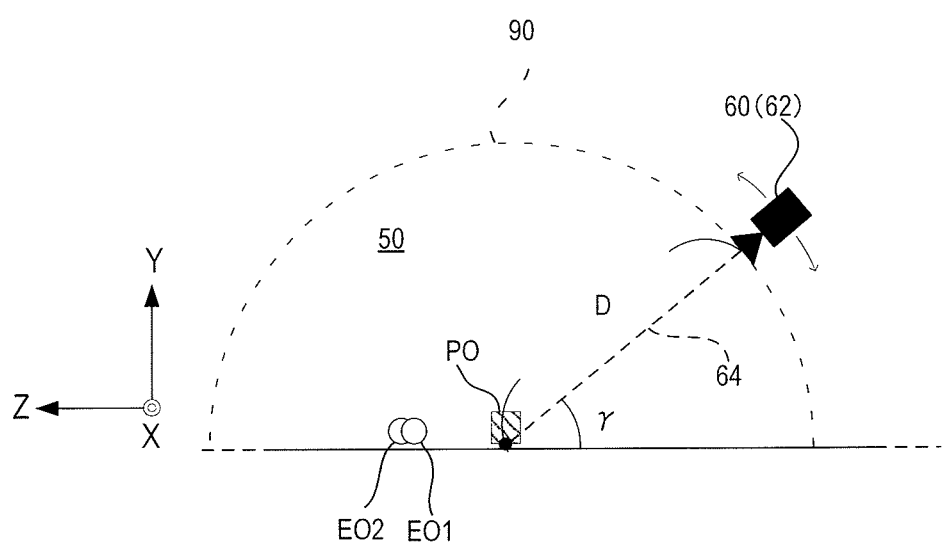
FIG. 3B is an explanatory view for explaining the positioning of the virtual camera by the execution of the non-battle camera control processing.

In the non-battle camera control processing, the position of the virtual camera 60 is determined based on the position of the player object PO as shown in FIGS. 3A and 3B. FIGS. 3A and 3B are explanatory views for explaining the positioning of the virtual camera 60 by the execution of the non-battle camera control processing. FIGS. 3A and 3B also show a state in which the player object PO and two bodies of enemy objects EO1 and EO2 exist in the game space 50. FIG. 3A shows a state of looking down at the game space 50. FIG. 3B shows a state of looking at the game space 50 shown FIG. 3A from a spot S toward an arrow direction.

The point of gaze is set at the position of the player object PO in the non-battle camera control processing. Additionally, a distance between the point of gaze (player object PO) and the virtual camera 60 is set to a given value D. Moreover, angles α, γ formed by a direction PCA in which the player object is directed and the visual axis 64 are held (set). The direction PCA indicates the direction in which the front of the player object PO is directed. Note that the direction PCA is stored in the RAM 102 and so on with information such as information of the present position of the player object PO.

The virtual camera 60 follows the movement of the player object PO so that the position corresponding to the above set information is maintained. For example, when the player object PO is moved from the state shown in FIGS. 3A and 3B, the virtual camera 60 moves to a position where the given value D and the angles α, γ are maintained with respect to the moved position of the player object PO.

According to the non-battle camera control processing, the game image in which the player object PO is positioned in the vicinity of the center is displayed on the display device 37. As shown in FIGS. 3A, 3B, when the virtual camera 60 is positioned at an upper rear position of the player object PO, the game image including an image of the rear of the player object PO is displayed on the display device 37.

Figure 6A:
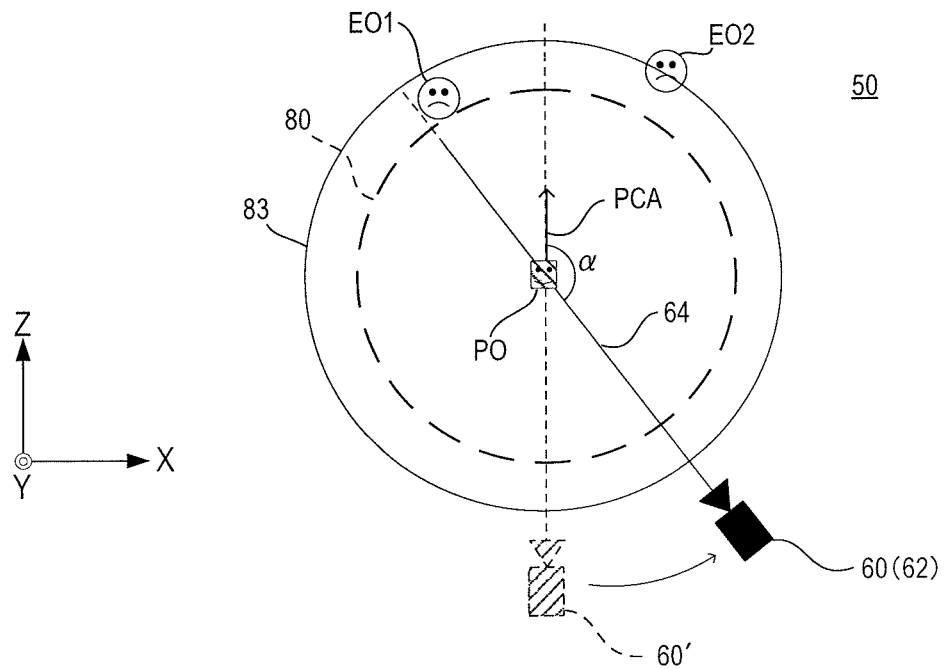
FIG. 6A is an explanatory view for explaining the transition from the non-battle camera control processing to the battle camera control processing.

Additionally, the user can move the virtual camera 60 in the upper, lower, right and left directions within a prescribed range by operating the operation unit 38. Specifically, the user can move the virtual camera 60 on a surface of a hemisphere 90 with a radius of the given value D centered at the point of gaze (player object PO). For example, the virtual camera 60 shown in FIG. 3A can be moved as shown in FIG. 6A. The game image including an image of the side of the player object is displayed on the display device 37 by the movement.

When the user moves the virtual camera 60 as described above, the angles α, γ change from values before the movement operation. The values of the angles α, γ after the change are held until the user performs operation again. Then, the virtual camera 60 is positioned based on the values after the change. Therefore, in the state shown in FIG. 6A, the angles α, γ shown in FIG. 6A are held when the player object PO is moved, and the game image including the image of the side of the player object PO is displayed on the display device 37.

Figure 7A:
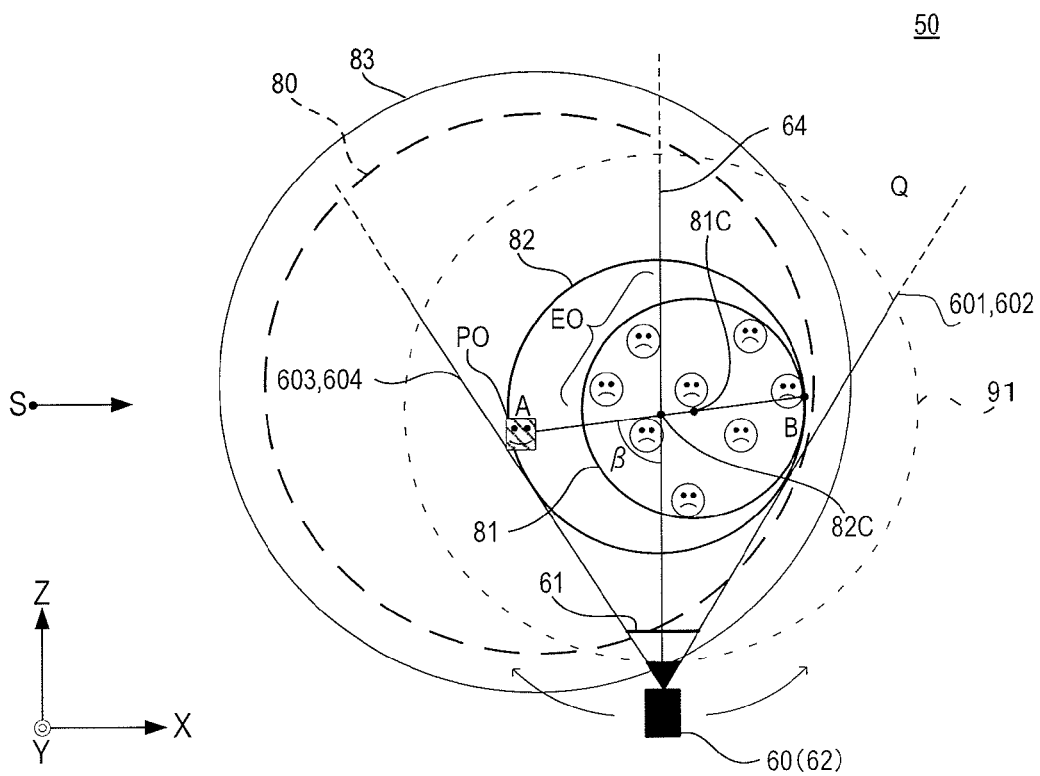
FIG. 7A is an explanatory view for explaining the positioning of the virtual camera by the execution of the battle camera control processing.
Figure 7B:
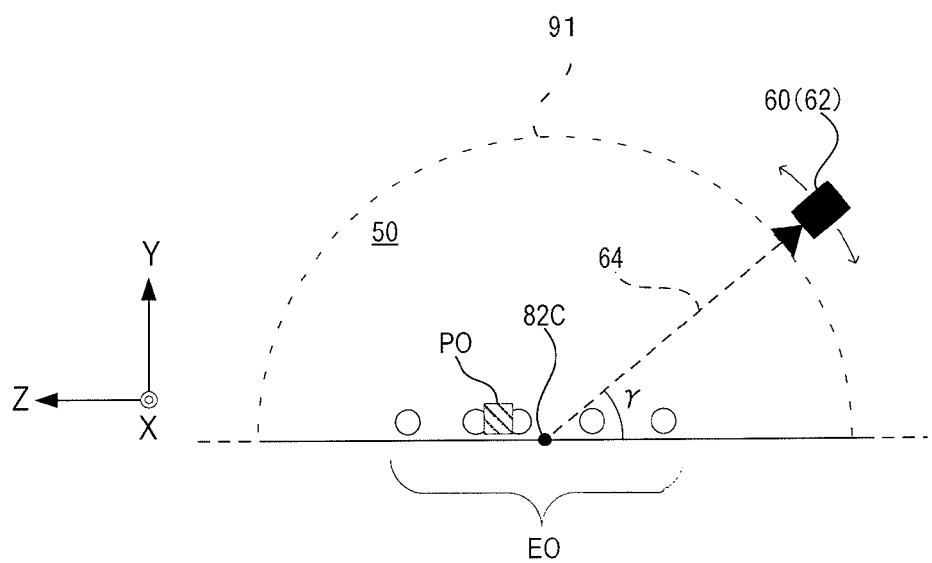
FIG. 7B is an explanatory view for explaining the positioning of the virtual camera by the execution of the battle camera control processing.

On the other hand, in the battle camera control processing, the position of the virtual camera 60 is determined in accordance with the positional relationship between the player object PO and enemy objects EO as shown in FIGS. 7A and 7B. Specifically, a CM circle area 82 is generated in accordance with the positional relationship between the player object PO and the enemy objects EO, and the position of the virtual camera 60 is determined so that the CM circle area 82 is included in the visual range Q.

FIGS. 7A and 7B are explanatory views for explaining the positioning of the virtual camera 60 by the execution of the battle camera control processing. FIGS. 7A and 7B also show a state in which the player object PO and eight enemy objects EO exist in the game space 50. FIG. 7A shows a state of looking down at the game space 50. FIG. 7B shows a state of looking at the game space 50 shown FIG. 7A from a spot S toward an arrow direction. Eight enemy objects EO are objects to be imaged.

The CM circle area 82 is generated based on positions of an EO circle area 81 and the player object PO. The EO circle area 81 is a circle area including eight enemy objects EO existing in a PO circle area 80, which is formed based on positions of eight enemy objects EO. The PO circle area 80 is a circle area centered at the present position of the player object PO with a radius of a given value. The PO circle area 80 corresponds to a given range of the present invention. The EO circle area 81 corresponds to a first area of the present invention. Additionally, the CM circle area 82 corresponds to a second area.

The CM circle area 82 is a circle area defined by a segment AB as a diameter, which includes a center point 81C of the BO circle area 81 and the player object PO. A position in which a center point 82C of the CM circle area 82 is the point of gaze and the CM circle area 82 is included in the visual range Q will be a new position of the virtual camera 60.

Processing of determining the segment AB differs depending on whether the player object PO is positioned in the outside of the EO circle area 81 or not. When the player object PO is positioned in the outside of the EO circle area 81 as shown in FIG. 7A, position coordinates of the player object PO are determined as coordinates of one end point A of the segment AB. As coordinates of the other end point B of the segment AB, coordinates of an intersection point between the segment AB and the EO circle area 81 is set.

Figure 8:
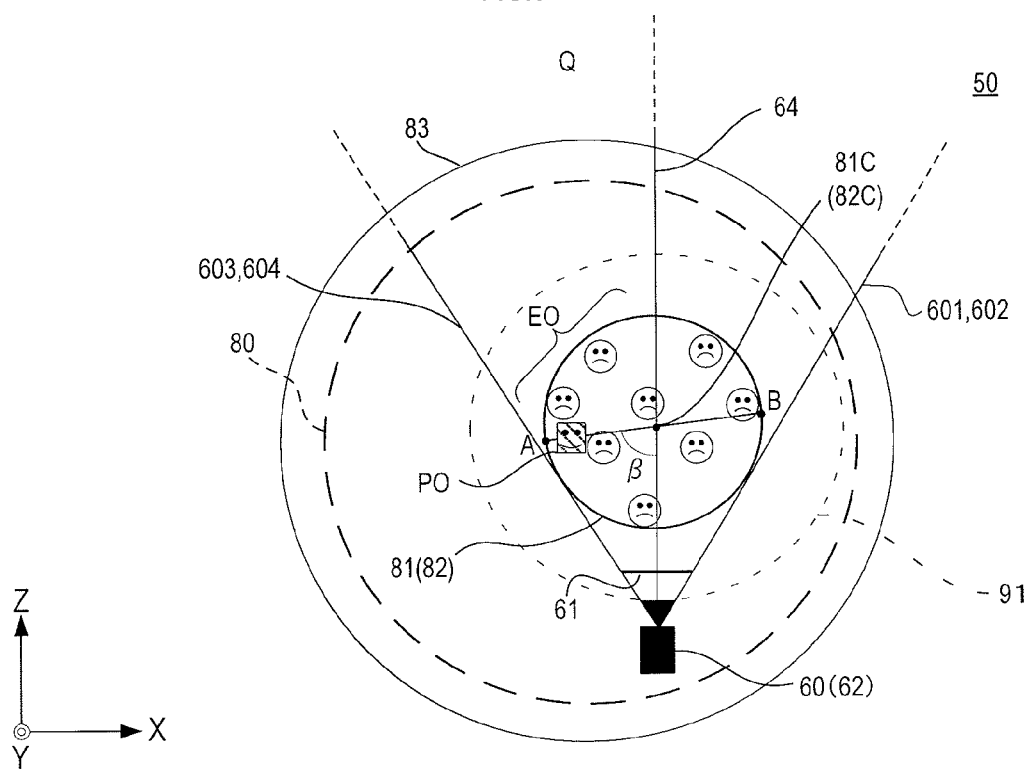
FIG. 8 is an explanatory view for explaining the positioning of the virtual camera by the execution of the battle camera control processing.

When the player object PO is positioned inside the EO circle area 81 as shown in FIG. 8, end points A and B of the segment AB will be intersection points between a straight line passing through the player object PO and the center point 81C of the EO circle area 81 and the EO circle area 81. That is, the CM circle area 82 is in a state of overlapping the EO circle area 81. FIG. 8 shows a state where the player object PO has moved to a position closer to the enemy objects EO from the state shown in FIGS. 7A and 7B.

Then, the point of gaze will be the center point 82C (81C) of the CM circle area 82. As the angles β, γ formed by the visual axis 64 and the segment AB, former values are basically held. Accordingly, when the point of gaze (center point 82C) is determined, the visual axis 64 is also determined.

Lastly, a new position of the virtual camera 60 is determined to a position where four straight lines 601 to 604 forming the visual range Q come in contact with the CM circle area 82 in plan view (XY plane). As described above, values of the angles β, γ are held and angles of the straight lines 601 to 604 with respect to the visual axis 64 are also fixed. Accordingly, equations of the straight lines 601 to 604 are derived. Moreover, as the equations of the straight lines 601 to 604 are derived, an intersection point between the straight lines 601 to 604 and the visual axis 64 is also calculated. Then, the intersection will be the new position of the virtual camera 60. As the computing of the above calculation in the game device is a common technique, the details are omitted.

Though the distance between the virtual camera 60 and the point of gaze is fixed in the non-battle camera control processing, the distance varies according to the size of the CM circuit area 82 in the battle camera control processing. When the CM circle area 82 is large, a larger area of the game space 50 has to be included in the visual range Q, therefore, the distance between the virtual camera 60 and the point of gaze (center point 82C) will be long. Conversely, when the CM circle area 82 is small, a small area of the game space 50 is included in the visual range Q, therefore, the distance between the virtual camera 60 and the point of gaze will be short.

For example, as the CM circle area 82 of FIG. 7A is larger than the CM circle area 82 of FIG. 8, a distance between virtual camera 60 and the point of gaze (center point 82C) of FIG. 7A is longer than a distance between the virtual camera 60 and the point of gaze (center point 82C) of FIG. 8.

Though the position of the virtual camera 60 is determined in a state where the straight lines 601 to 604 intersect with the CM circle area 82 in the embodiment, the present invention is not limited to this as long as the CM circle area 82 is included in the visual range Q. It is also preferable that the straight lines 601 to 604 do not intersect with the CM circle area 82.

According to the above battle camera control processing, the game image is generated so that the player object PO and the enemy objects EO existing in the CM circle area 82 are included. As the EO circle area 81 formed by the enemy objects EO to be targets is used, for example, when the enemy objects EO move within a range of the EO circuit area 81, a variation of the EO circle area 81 is small. Accordingly, the increase in the variation of the position of the virtual camera 60 (visual point 62) due to the movement of the enemy objects EO can be suppressed. Therefore, it is possible to suppress a sudden change of the contents of the game image, which will be visually recognized by the user easily.

In the embodiment, when the player object PO is positioned in the outside of the EO circle area 81, the CM circle area 82 is formed by setting the position of the player object PO as the end point A, however, the present invention is not limited to this. The new position of the virtual camera 60 can be determined based on the positional relationship between the player object PO and the EO circle area 81.

For example, as shown in FIG. 14, a middle point of a segment connecting the player object PO and the center point 81C of the EO circle area 81 is set as the center point 82C of the CM circle area 82. Moreover, an intersection point between a segment passing through the player object PO and the center point 81C and the EO circle area 81 is set as the end point B to form the CM circle area 82 defined by a segment connecting the center point 82C and the end point B as a radius. Accordingly, the CM circle area 82 is formed so as to include the player object PO inside, therefore, it is easier to visually recognize the player object PO.

Also in the state where the battle camera control processing is executed, the user can move the position of the virtual camera 60 in the upper, lower, right and left directions in the same manner as in the case of the non-battle camera control processing. In the battle camera control processing, the point of gaze will be the center point 82C of the CM circle area 82. Therefore, the user can move the virtual camera 60 on a spherical surface of a hemisphere 91 (FIG. 7B) centered at the point of gaze (center point 82C).

Also in the battle camera control processing, the position of the virtual camera 60 with respect to the point of gaze (center point 82C) moved by the user is held until the user performs operation again in the same manner as in the case of the non-battle camera control processing. Specifically, the angles $\beta$, $\gamma$ are held. Note that a radius of the hemisphere 91 will be a distance between the position of the virtual camera 60 determined by the battle camera control processing and the point of gaze (center point 82C). Accordingly, the value of the radius does not vary according to the operation by the user.

Also in the embodiment, the EO circle area 81 is formed with respect to enemy objects EO selected (registered) as objects to be imaged in enemy objects EO existing in the PO circle area 80 of the player object PO. Then, the CM circle area 82 is formed based on the positional relationship between the player object PO and the objects to be imaged and the position of the virtual camera 60 is determined. That is, the new position of the virtual camera 60 is determined so that the player object PO and the enemy objects EO registered as the objects to be imaged are included in the game image.

The enemy object EO adjacent to another enemy object EO in enemy objects existing in the PO circle area 80 is basically registered as the object to be imaged. Specifically, the enemy object EO existing within a given distance from another enemy object EO is registered as the object to be imaged. Hereinafter, the explanation will be made with reference to FIGS. 9A, 9B and 9C.

Figure 9A:
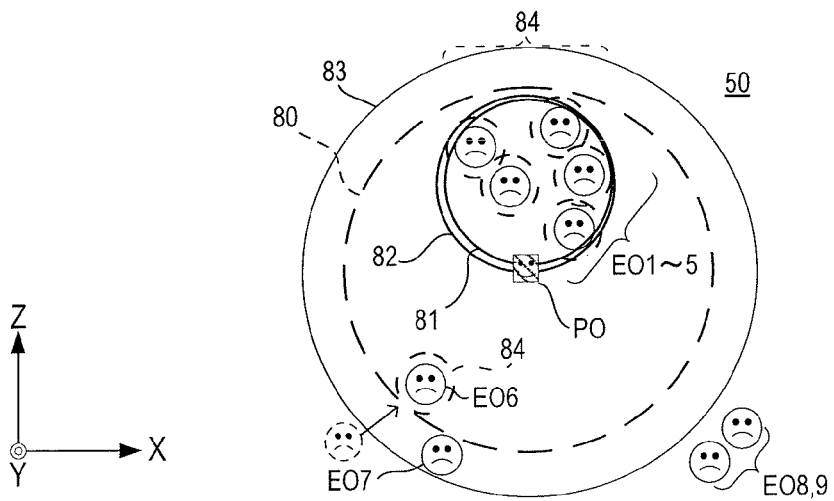
FIG. 9A is an explanatory view for explaining an EO circle area by the execution of the battle camera control processing.
Figure 9B:
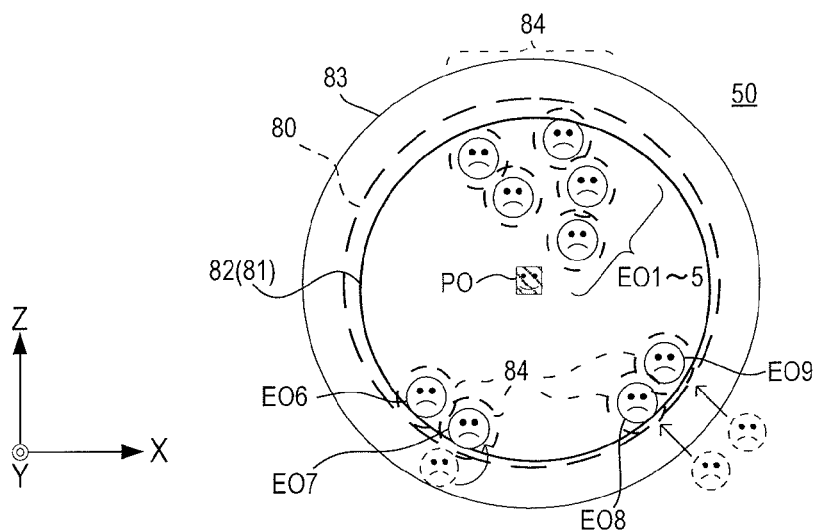
FIG. 9B is an explanatory view for explaining the EO circle area by the execution of the battle camera control processing.
Figure 9C:
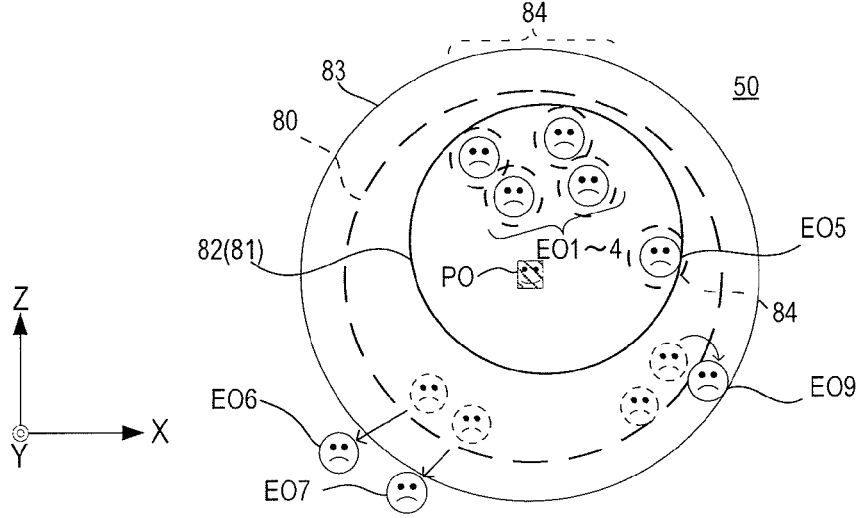
FIG. 9C is an explanatory view for explaining the EO circle area by the execution of the battle camera control processing.

FIGS. 9A, 9B and 9C are explanatory views for explaining the EO circle area 81 in execution of the battle camera control processing. FIGS. 9A, 9B and 9C show the state of looking down at the game space 50. For convenience of explanation, the virtual camera 60 and the like are not shown.

First, the explanation will be made with reference to FIG. 9A. FIG. 9A shows a state where an enemy object EO6 has moved into the PO circle area 80 in which enemy objects EO1 to EO5 exist. Adjacent circle areas 84 are set in respective enemy objects EO1 to EO6. Each of the adjacent circle area 84 is formed with a radius of a given value centered at each of the enemy objects EO1 to EO6. Whether the enemy objects are adjacent or not is determined by using the adjacent circle areas 84. When the adjacent circle area 84 of a certain enemy object EO overlaps the adjacent circle area 84 of another enemy object EO, it is determined that the enemy object EO is adjacent.

The adjacent circle area 84 of each of the enemy objects EO1 to EO5 overlaps any of adjacent circle areas 84 of other enemy objects EO1 to EO5 in the PO circle area 80. Therefore, because the enemy objects EO1 to EO5 are adjacent to other enemy objects EO1 to EO5, they are registered as objects to be imaged.

On the other hand, the adjacent circle area 84 of the enemy object EO6 does not overlap any of the adjacent circle areas 84 of other enemy objects EO1 to EO5 in the PO circle area 80. Therefore, the enemy object EO6 is not registered as the object to be imaged.

Then, the EO circle area 81 is formed based on positions of the enemy objects EO1 to EO5 as the objects to be imaged in the same manner as described above. Moreover, the CM circle area 82 is formed and a new position of the virtual camera 60 is determined based on the positional relationship between the EO circle area 81 and the player object PO.

Next, a case where the state shown in FIG. 9A has made a transition to a state shown in FIG. 9B will be explained. FIG. 9B shows a state where enemy objects EO7 to EO9 have moved into the PO circle area 80. In FIG. 9B, the enemy objects EO6 and EO7 are adjacent. Moreover, the enemy objects EO8 and EO9 are also adjacent in FIG. 9B.

Therefore, the enemy objects EO6 to EO9 are also registered as objects to be imaged in addition to the enemy objects EO1 to EO5. Then, the HO circle area 81 is formed based on positions of the enemy objects EO1 to EO9 as the objects to be imaged in the same manner as described above. Additionally, the CM circle area 82 is formed and a new position of the virtual camera 60 is determined.

Next, a case where the state shown in FIG. 9B has made a transition to a state shown in FIG. 9C will be explained. FIG. 9C shows a state where the enemy object EO5 has moved and is not adjacent to enemy objects EO1 to EO4 in the PO circle area 80. FIG. 9C also shows a state where the enemy objects EO6, EO7 and EO9 have moved to the outside of the PO circle area 80 and an end determination area 83. Furthermore, FIG. 9C shows a state where the enemy object EO8 has disappeared by receiving an attack of the player object PO.

Here, a condition where the registration of the object to be imaged is canceled is that the object is removed from the inside of the PO circle area 80 by the movement or disappearance due to the attack to the player object PO and other reasons. Therefore, the registration of the enemy object HO registered as the object to be imaged during the execution of the battle camera control processing is held as the object to be imaged even when the object is not adjacent to another enemy object EO while existing in the PO circle area 80.

Accordingly, it is possible to prevent registration and cancel of the object to be imaged from being repeated frequently. It is also possible to prevent frequent change in size of the CM circle area 82.

The enemy object EO5 shown in FIG. 9C exists in the PO circle area 80 and has already been registered as the object to be imaged. Accordingly, the registration of the object to be imaged is held though the object is not adjacent to another enemy object at present. On the other hand, the enemy objects EO6, EO7 and EO9 have already been registered as the object to be imaged. However, these enemy objects EO6, EO7 and EO9 do not exist in the PO circle area 80 due to the movement, therefore, the registration as the objects to be images is canceled. Furthermore, the enemy object EO8 does not exist in the PO circle area 80 due to disappearance, therefore, the registration as the object to be imaged is also canceled.

Accordingly, the enemy objects EO1 to EO5 will be objects to be imaged in the state shown in FIG. 9C. Then, the HO circle area 81 is formed based on positions of these enemy objects EO1 to EO5 in the same manner as described above. Moreover, the CM circle area 82 is formed and a new position of the virtual camera 60 is determined.

Because the enemy object EC9 exists in the end determination area 83 though it is outside the PO circle area 80, the object is registered as a canceled object. The canceled object will be described later.

Next, switching between the non-battle camera control processing and the battle camera control processing will be explained. The control unit 101 alternatively executes the non-battle camera control processing and the battle camera control processing. The non-battle camera control processing is executed when there is no enemy object EO around the player object PO as described above. On the other hand, the battle camera control processing is executed when there exists an enemy object EO around the player object PO.

First, the transition from the non-battle camera control processing to the battle camera control processing will be explained. FIGS. 4A, 4B to FIGS. 6A, 6B are explanatory views for explaining the transition from the non-battle camera control processing to the battle camera control processing.

In the non-battle camera control processing, the transition to the battle camera control processing is started under a condition where at least one enemy object EO has come to exist in the PO circle area 80. Specifically, transition processing to battle camera control is executed from the middle of the non-battle camera control processing. After that, the execution of the battle camera control processing is started.

In the transition processing to battle camera control, the enemy objects EO of the PO circle area 80 are registered as the objects to be imaged and the EO circle area 81 of the objects to be imaged is formed in the same manner as the battle camera control processing though part of the processing contents differs. Then, the CM circle area 82 is formed and a new position of the virtual camera 60 is determined.

Figure 4A:
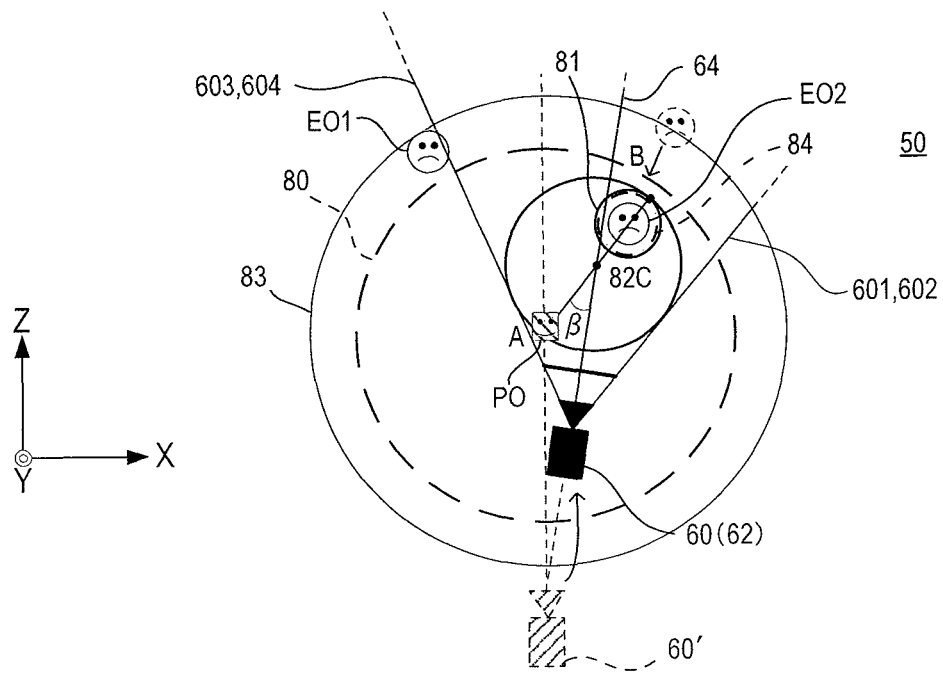
FIG. 4A is an explanatory view for explaining the transition from the non-battle camera control processing to battle camera control processing.

For example, a case where the state shown in FIGS. 3A and 3B has made a transition to a state shown in FIG. 4A will be explained. FIG. 4A shows a state where the enemy object EO2 has moved into the PO circle area 80 of the player object PO. As the enemy object EO2 has come to exist in the PO circle area 80, the non-battle camera control processing substantially ends and the transition processing to battle camera control is started.

In the transition processing to battle camera control, even when only one enemy object EO exists in the PO circle area 80 as shown in FIG. 4A, the enemy object EO is registered as the object to be imaged. Therefore, the enemy object EO2 is registered as the object to be imaged. Then, after the EO circle area 81 is formed based on the position of the enemy object EO2, the CM circle area 82 is formed in the same manner as the battle camera control processing.

Figure 5A:
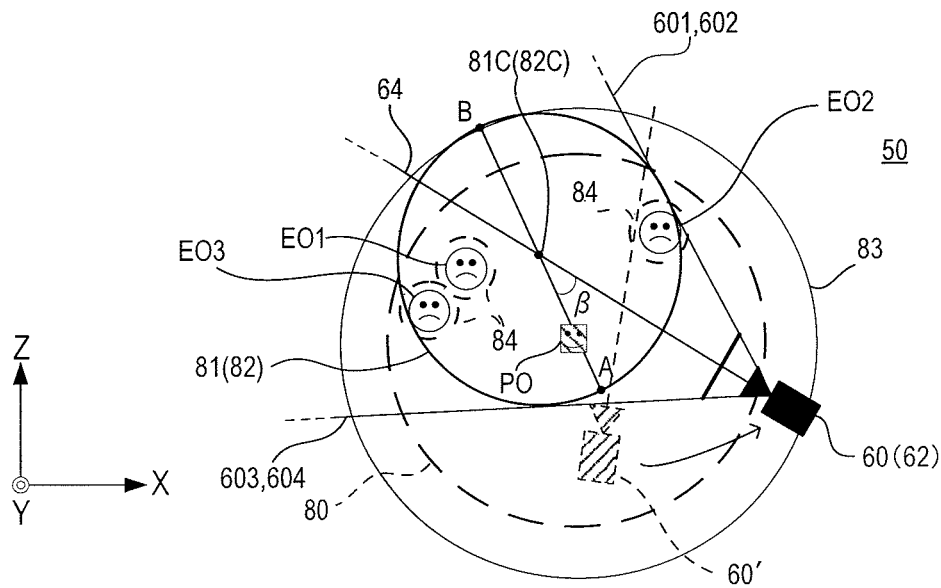
FIG. 5A is an explanatory view for explaining the transition from the non-battle camera control processing to the battle camera control processing.
Figure 5B:
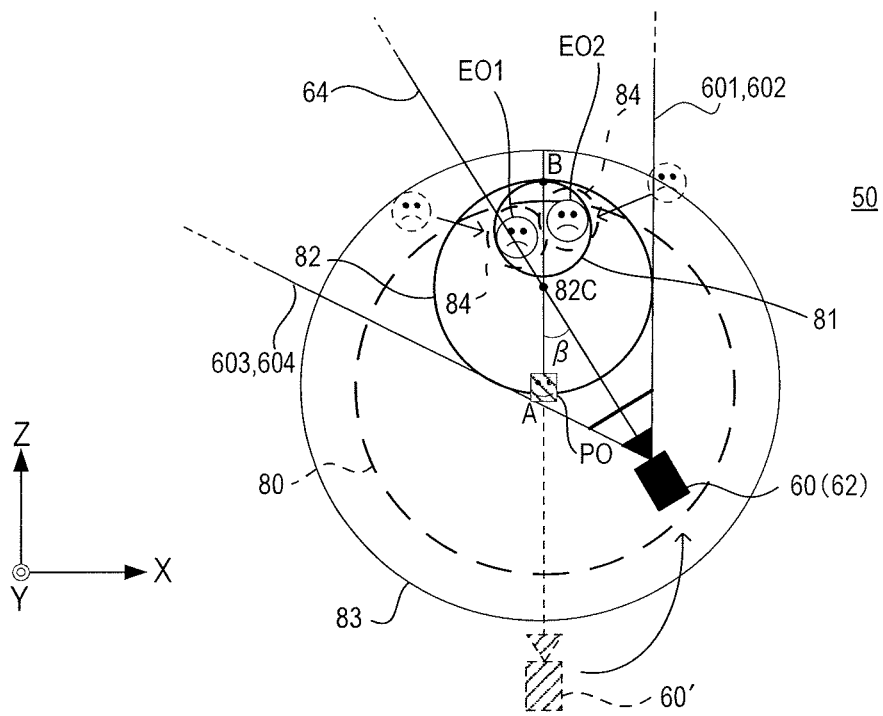
FIG. 5B is an explanatory view for explaining the transition from the non-battle camera control processing to the battle camera control processing.

In the case where two adjacent enemy objects EO1 and EO2 exist in the PO circle area 80 as shown in FIG. 5B, these enemy objects EO1 and EO2 are registered as objects to be imaged. Additionally, for example, in the case where further another enemy object EO exists in a state of not being adjacent in the PO circle area in the state shown in FIG. 5B, another enemy object EO is not registered as the object to be imaged. The registration of the adjacent enemy objects as the objects to be imaged is given priority.

Here, the transition processing to battle camera control differs from the battle virtual camera control processing in processing for determining the position of the virtual camera 60 based on the CM circle area 82. Specifically, the setting of the visual axis 64 differs. In the transition processing to battle camera control, a straight line 95 passing through the virtual camera 60 in the former position and the center point 82C of the CM circle area 82 is set as the visual axis 64. In FIG. 4A, a virtual camera 60' is in the former position. The straight line passing through the virtual camera 60' and the center point 82C is set as the visual axis 64.

After that, the position of the virtual camera 60 is determined so that the straight lines 601 to 604 are tangent to the CM circle area 82 in the same manner as the battle camera control processing. Then, the transition processing to battle camera control ends and the battle camera control processing is performed after that.

Figure 4B:
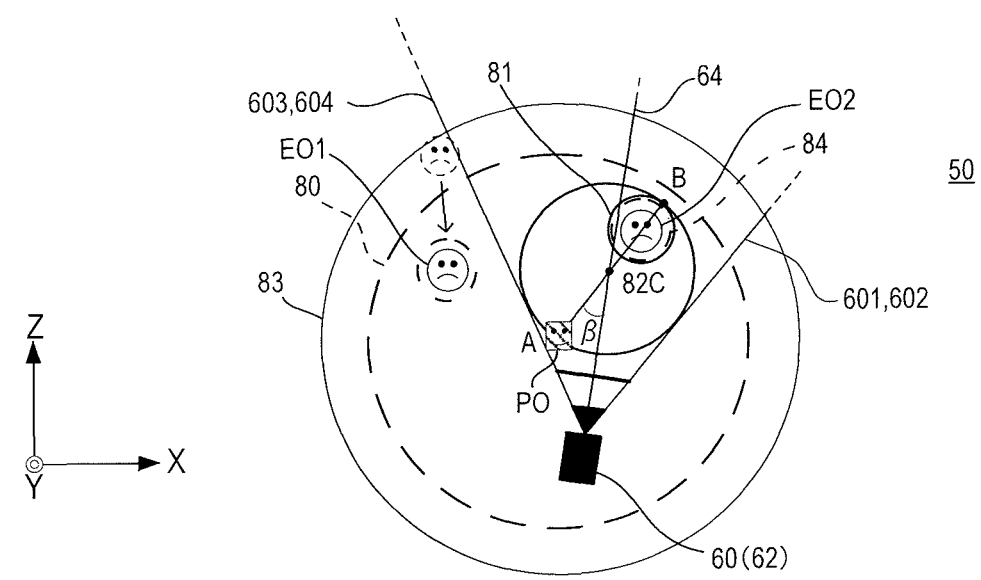
FIG. 4B is an explanatory view for explaining the transition from the non-battle camera control processing to the battle camera control processing.

Accordingly, for example, when the enemy object EO1 has moved into the PO circle area 80 as shown in FIG. 4B from the state shown in FIG. 4A, the enemy object EO1 is not registered as the object to be imaged in the battle camera control processing. That is because the enemy object EO1 is not adjacent to another enemy object EO.

After that, in the case where the enemy object EO1 has come to be adjacent to the enemy object EO3 as shown in FIG. 5A from the state shown in FIG. 4B, the enemy objects EO1 and EO3 are registered as objects to be imaged in the battle camera control processing. Then, the EO circle area 81 is formed by including the enemy objects EO1 to EO3. In this case, the visual axis 64 is set in the state where the former values of the angles β, γ are held as the processing is the battle camera control processing.

Figure 6B:
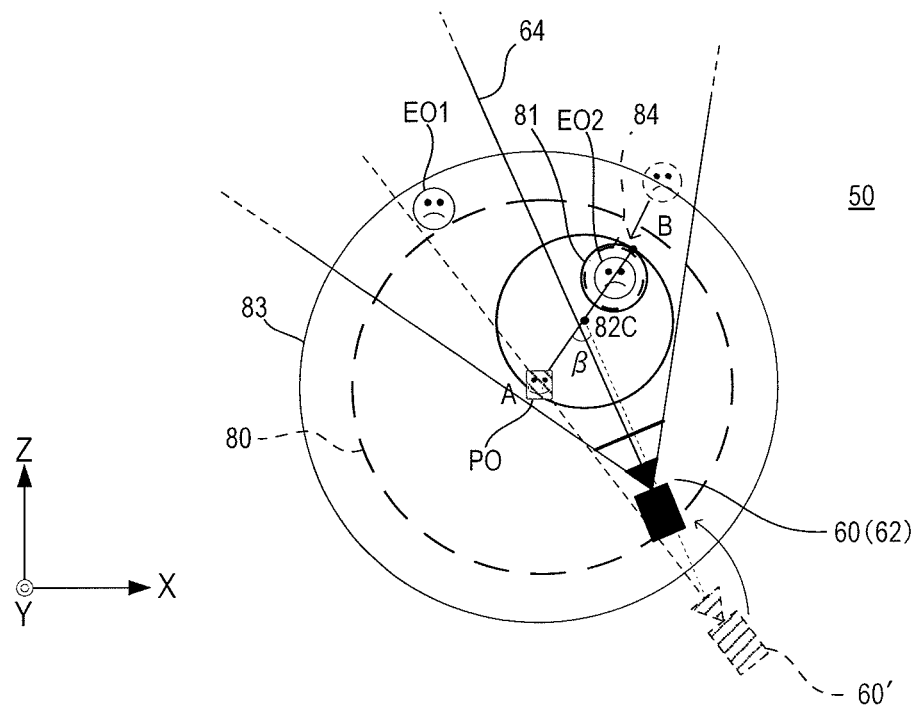
FIG. 6B is an explanatory view for explaining the transition from the non-battle camera control processing to the battle camera control processing.

Next, the case where the state shown in FIG. 6A has made a transition to a state shown in FIG. 6B will be explained. FIG. 6A shows the state where the virtual camera 60 has moved from the state shown in FIGS. 3A and 3B by user's operation. FIG. 6B shows a state where the enemy object EO2 has moved into the PO circle area 80.

According to the transition from the state shown in FIG. 6A to the state shown in FIG. 6B, the non-battle camera control processing substantially ends and the transition processing to battle camera control is started.

Accordingly, also in the case shown in FIG. 6B, the enemy object EO2 is registered as the object to be imaged in the same manner as in the case shown in FIG. 4A. Then, the CM circle area 82 is formed after the EO circle area 81 is formed based on the position of the enemy object EO2 as the object to be imaged. Also concerning the visual axis 64, the straight line passing through the virtual camera 60 (virtual camera 60') in the former position and the center point 82C is set as the visual axis 64 in the same manner as in the case shown in FIG. 4A. Then, a new position of the virtual camera 60 is determined based on the CM circle area 82 and the like.

As described above, in the transition processing to battle camera control according to the embodiment, the straight line passing through the virtual camera 60 (virtual camera 60') in the former position and the center point 82C of the CM circle area 82 is basically set as the visual axis 64. However, when an angle β formed by the straight line to be the visual axis 64 and the segment AB is 0 degrees or 90 degrees, the straight line is not set as the visual axis 64. Instead of that, a straight line in which the angle β will be a given value (for example, 30 degrees) will be set as the visual axis 64.

The above corresponds to a case, for example, where the state shown in FIGS. 3A and 3B has made a transition to a state shown in FIG. 5B. FIG. 5B shows a state where the enemy objects EO1 to EO2 have moved to the PO circle area 80 to be adjacent to each other. Because the enemy objects EO1 and EO2 are adjacent to each other in the PO circle area 80, they are registered as objects to be imaged. Then, after the EO circle area 81 is formed based on positions of these enemy objects EO1 and EO2, the CM circle area 82 is formed.

Here, the straight line passing through the virtual camera 60 (virtual camera 60') in the former position and the point of gaze (center position 82C) is parallel to the segment AB shown in FIG. 5B. In this case, the angle β obtained when the straight line is set as the visual line 64 is 0 degrees. Accordingly, the straight line is not set as the visual axis 64, and the straight line in which the angle β is a given value (for example, 30 degrees) is set as the visual axis 64. Then, a new position of the virtual camera 60 is determined based on the CM circle 82 and so on in the same manner as described above.

As the reason for setting the visual axis 64 in which the angle β is a given value, when the straight line in which the angle β is 0 degrees is set as the visual axis 64, the player object PO will be positioned in the center of the game image with respect to the new position of the virtual camera 60, therefore, it is hard to see the enemy object EO.

For example, in a case where the straight line in which the angle β is 0 degrees is set as the visual axis 64 in the state shown in FIG. 5B, the virtual camera 60 is positioned between the virtual camera in the former position (virtual camera 60') and the player objet PO. In this case, the player object PO occupies a relatively large area in the center of the game image. Accordingly, the enemy objects EO1 and EO2 positioned in the back of the player object PO with respective to the virtually camera 60 are hidden behind the player object PO, therefore, it is hard to see the enemy objects EO1 and EO2.

Though it is not hard to see the enemy objects EO when the straight line in which the angle β is 90 degrees is set as the visual axis 64, it is preferable to avoid a situation where the player object PO is positioned at the end of the side surface of the game image.

There may be a case where plural enemy objects EO move into the PO circle area 80 in a state where they are not adjacent to one another from the state where there is no enemy object EO in the PO circle area 80 as shown in FIGS. 3A and 3B. In this case, only one enemy object selected at random from these enemy objects EO may be registered as the object to be imaged. It is also preferable that the enemy object EO closest to the player object PO may be selected as the object to be imaged.

Next, the transition from the battle camera control processing to the non-battle camera control processing will be explained. FIGS. 10A, 10B to FIGS. 13A, 13B are explanatory views for explaining the transition from the battle camera control processing to the non-battle camera control processing. In the battle camera control processing, the transition to the non-battle camera control processing is started under a condition where there are not any enemy objects EO in the PO circle area 80 as well as there are not any canceled objects. Specifically, the transition processing to non-battle camera processing is executed from the middle of the battle camera control processing. After that, the execution of the non-camera control processing is started.

Figure 10A:
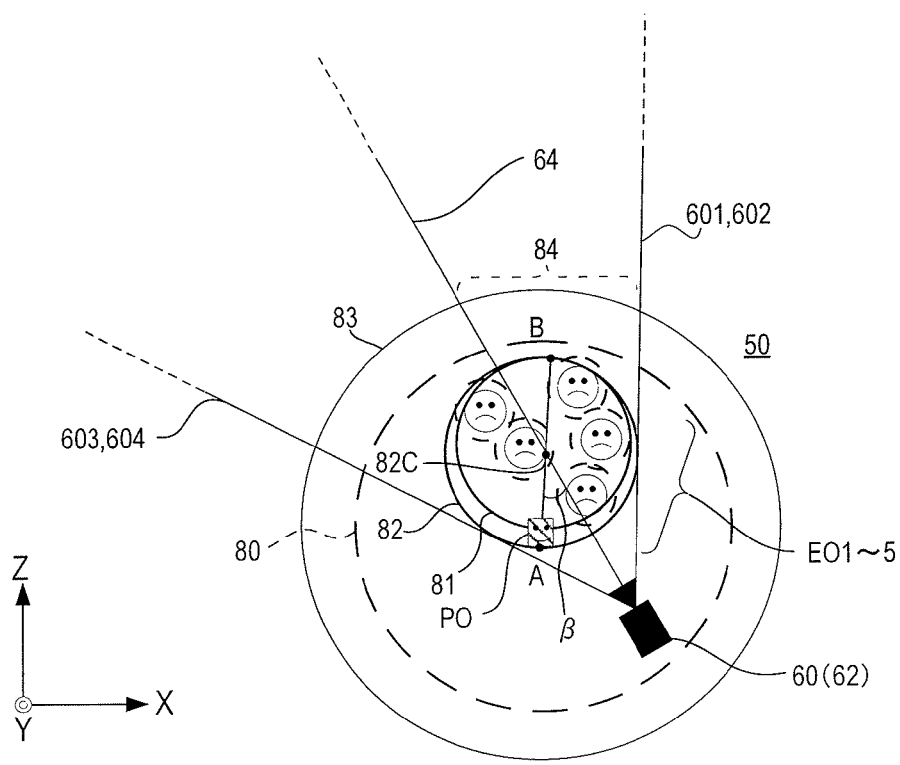
FIG. 10A is an explanatory view for explaining the transition from the battle camera control processing to the non-battle camera control processing.
Figure 10B:
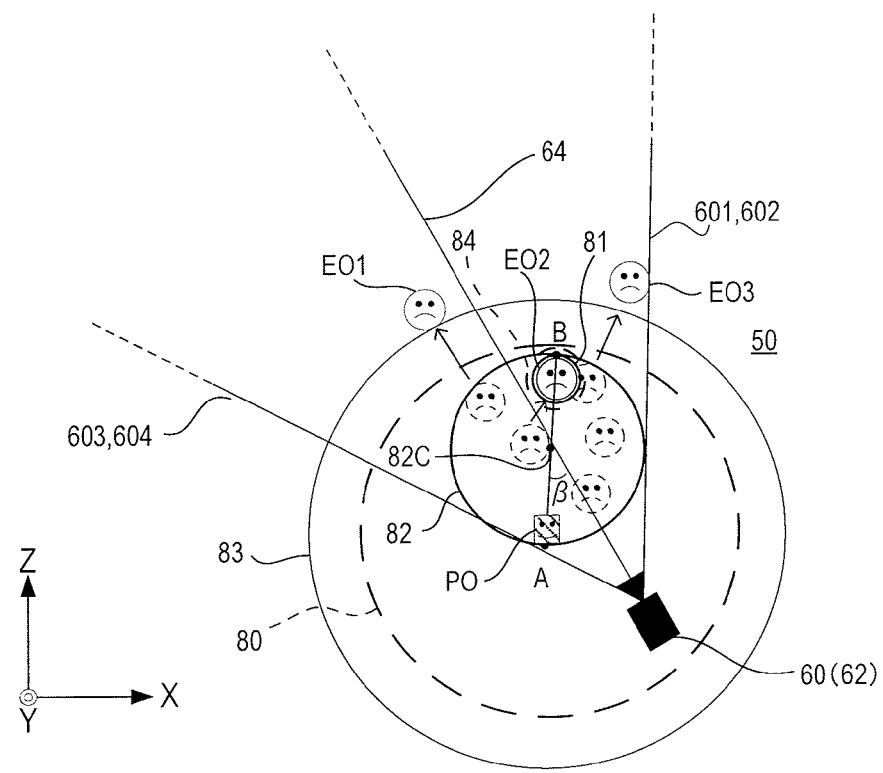
FIG. 10B is an explanatory view for explaining the transition from the battle camera control processing to the non-battle camera control processing.

For example, a case where a state shown in FIG. 10A has made transitions sequentially to states shown in FIGS. 10B, 11A and 119 will be explained. First, a case where the state shown in FIG. 10A makes a transition to a state shown in FIG. 10B will be explained. FIG. 10A shows a state where enemy objects EO1 to EO5 exist in the PO circle area 80 as objects to be imaged. FIG. 10B shows a state where the enemy objects EO1 to EO3 have moved and the enemy objects EO4 and 905 have disappeared by receiving an attack of the player object PO.

Because the enemy objects 901 and EO3 have moved to the outside of the PO circle area 80, the registration as the objects to be imaged are canceled. The enemy objects EO4 and 905 have disappeared and do not exist in the PO circuit area 80, the registration as the objects to be imaged are canceled. Therefore, only the registration of the enemy object EO2 is held as the object to be imaged. Accordingly, the battle camera control processing is continued and the EO circle area 81 is formed based on the position of the enemy object EO2. Then, the CM circle area 82 is formed and a new position of the virtual camera 60 is determined.

Next, a case where the state shown in FIG. 10B has made a transition to a state shown in FIG. 11A will be explained. FIG. 11A shows a state where the enemy object EO2 has moved to the outside of the PO circle area 80. In this case, the registration of the enemy object EO2 as the object to be imaged is also canceled.

The enemy object EO2 exists in the inside of the end determination area 83. Additionally, because the enemy object EO2 has been registered as the object to be imaged, it is registered as the canceled object. The end determination area 83 is a circle area including the PO circle area 80 centered at the player object PO. The end determination area 83 is used for determining the registration of the canceled object so as to determine the end of the battle camera control processing.

The canceled object is included in the condition of switching from the battle camera control processing to the non-battle camera control processing as described above. Even when there is no enemy object EO in the PO circle area 80, switching to the non-battle camera control processing is not performed as long as the canceled object exists. This is for preventing frequent occurrence of switching between the battle camera control processing and the non-battle camera control processing by the enemy objects EO frequently coming from and going to the inside and the outside of the PO circle area 80, thereby reducing frequent change of the position of the virtual camera 60.

Here, the registration of the canceled object is performed under a condition where the enemy object EO exists in the outside of the PO circle area 80 as well as in the end determination area 83 after registered as the object to be imaged in the PO circle area 80. The registration of the canceled object is canceled under a condition where the object has moved outside the end determination area 83.

Figure 11A:
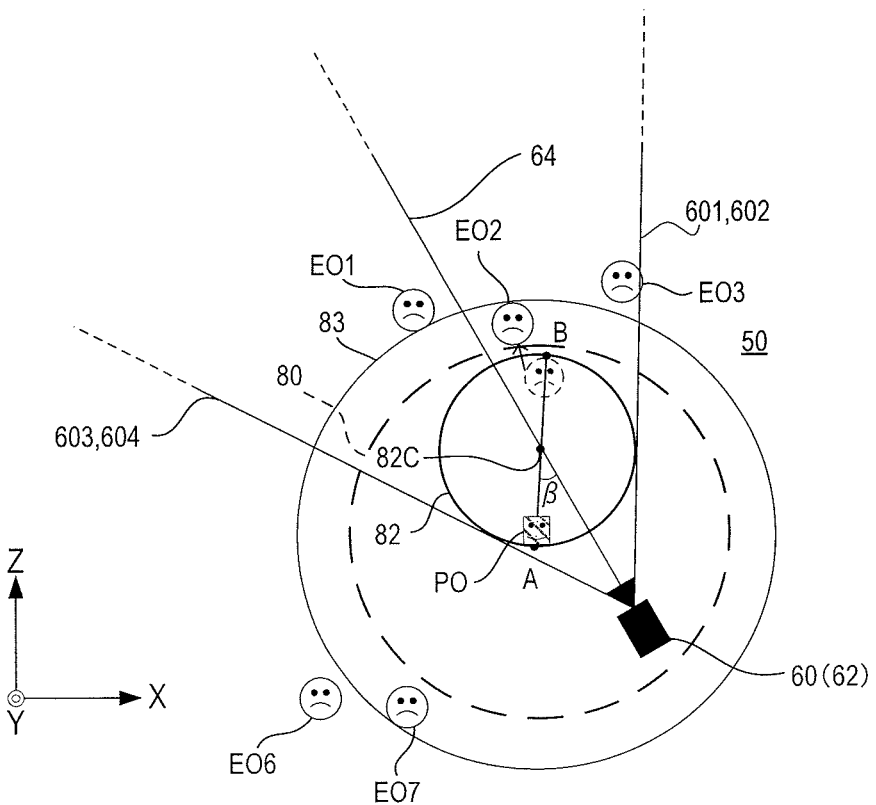
FIG. 11A is an explanatory view for explaining the transition from the battle camera control processing to the non-battle camera control processing.

Because the enemy object 502 is registered as the canceled object in the state shown in FIG. 11A, the transition to the non-battle camera control processing is not performed and the battle control processing is continued. In the state shown in FIG. 11A, the EO circle area 81 based on the enemy object 50 is not formed. That is because there is no enemy object EO in the PO circle area 80. Accordingly, the former shape of the CM circle area 82 is held as the shape of the CM circle area 82.

Also in the state shown in FIG. 11A, the position of the CM circle area 82 is determined based on the position of the player object PO. Specifically, when the present position of the player object PO is the inside of the CM circle area 82 in the former position, a new position of the CM circle area 82 will be the same position as the former position. That is, the CM circle area 82 in the former position is set again as a new CM circle area 82.

On the other hand, when the present position of the player object PO is in the outside of the CM circle area 82, a new position of the CM circle area 82 is determined in accordance with the position of the player object PO. That is, the CM circle area 82 in the former position is set again as a new CM circle area 82 though the arrangement position differs. Hereinafter, explanation will be made with reference to FIGS. 13A and 13B.

Figure 12A:
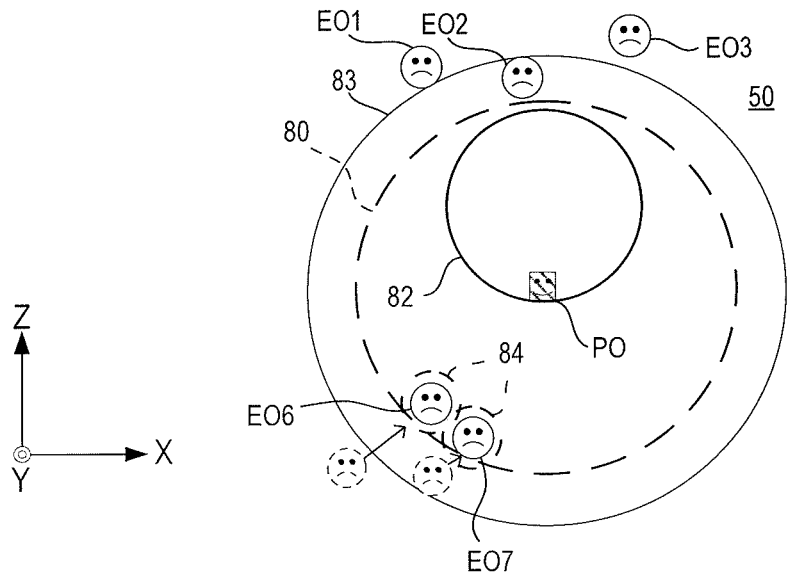
FIG. 12A is an explanatory view for explaining the transition from the battle camera control processing to the non-battle camera control processing.
Figure 13A:
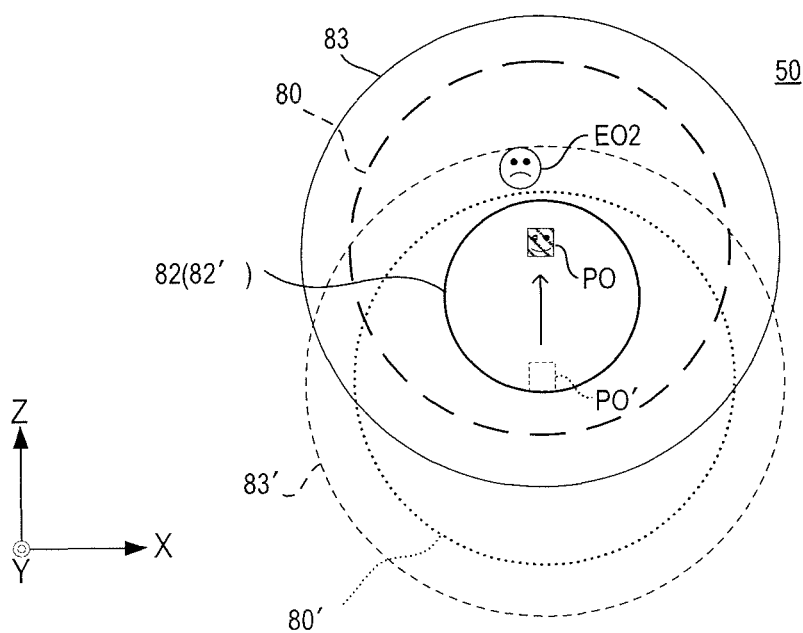
FIG. 13A is an explanatory view for explaining the transition from the battle camera control processing to the non-battle camera control processing.
Figure 13B:
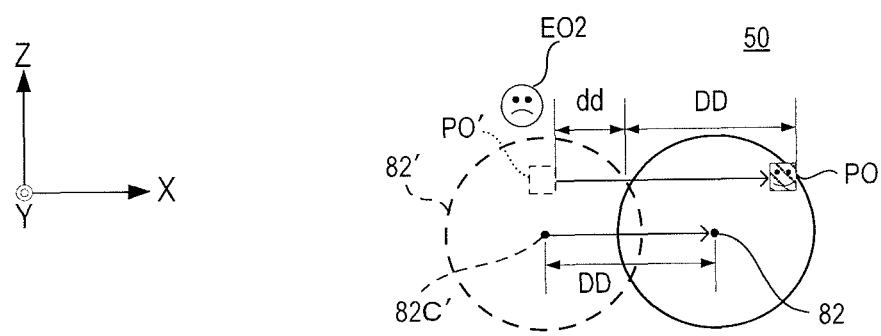
FIG. 13B is an explanatory view for explaining the transition from the battle camera control processing to the non-battle camera control processing.

FIG. 13A shows a state where the player object PO has moved from a state shown in FIG. 12A. FIG. 13B shows a state where the player object PO has moved from the state shown in FIG. 13A. For convenience of explanation, enemy objects EO1, EO3 and so on are not shown.

In FIG. 13A, the player object PO in the former position is a player object PO' and the CM circle area 82 in the former position is a CM circle area 82'. The player object PO' corresponds to the player object PO shown in FIG. 12A and the CM circle area 82' corresponds to the CM circle area 82 shown in FIG. 12A.

The present position of the player object PO is within a range of the CM circle area 82'. Therefore, the CM circle area 82' is set again as a new CM circle area 82. The PO circle area 80 and the end determination area 83 centered at the player object PO move in accordance with the movement of the player object PO.

In FIG. 13B, the player object PO in the former position corresponds to the player object PO' and the CM circle area 82 in the former position corresponds to the CM circle area 82'. The player object PO' corresponds to the player object PO shown in FIG. 13A and the CM circle area 82' corresponds to the CM circle area 82 shown in FIG. 13A.

The present position of the player object PO is the outside of the CM circle area 82'. Accordingly, a new position of the CM circle area 82 is determined in accordance with the present position of the player object PO. Specifically, the new CM circle area 82 will be an area where CM circle area 82' is moved in a movement direction of the player object PO by a movement amount DD of the player object PO in the outside of the CM circle area 82'. That is, a movement amount dd of the player object PO in the inside of the CM circle area 82' is not considered.

In FIG. 11A, the present position of the player object PO is not changed from the state shown in FIG. 10B, therefore, a new CM circle area 82 is set to the former position again.

Figure 11B:
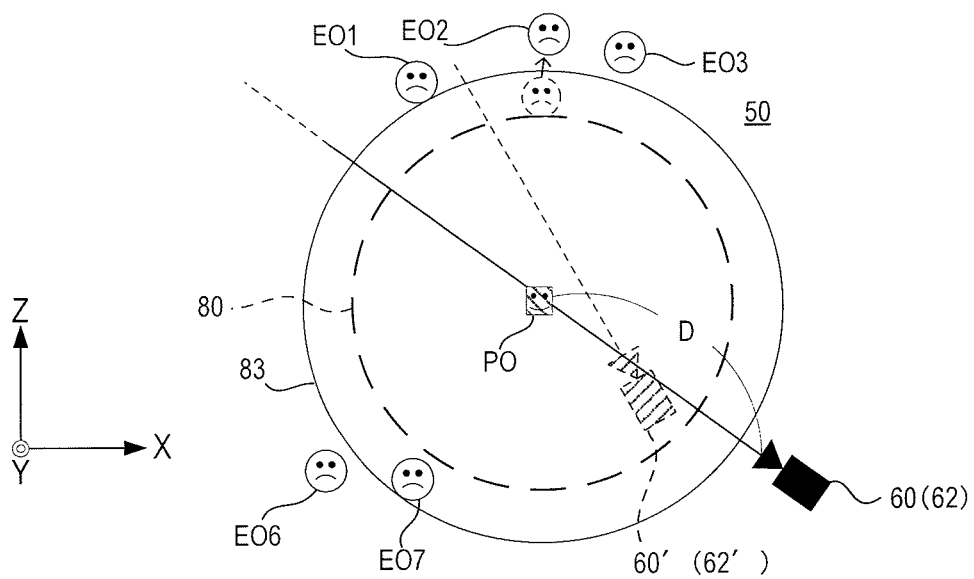
FIG. 11B is an explanatory view for explaining the transition from the battle camera control processing to the non-battle camera control processing.

Next, a case where the state shown in FIG. 11A has made a transition to a state shown in FIG. 11B will be explained. FIG. 11B shows a state where the enemy object EO2 has moved to the outside of the end determination area 83. Accordingly, the registration of the enemy object EO2 as the canceled object is canceled. Therefore, the battle camera control processing substantially ends and the transition processing to non-battle camera control is started as there is no enemy object EO in the PO circle area 80 as well as there is no canceled object.

In the transition processing to non-battle camera control, a new position of the virtual camera 60 is determined based on the position of the player object PO in the same manner of the non-battle camera control processing. However, in the transition processing to non-battle camera control differs from the non-battle camera control processing in the setting of the visual axis 64. In the transition processing to non-battle camera control, the straight line passing through the virtual camera 60 in the former position and the player object PO in the present position is set as the visual axis 64.

In FIG. 11B, the virtual camera 60 in the former position is the virtual camera 60'. A straight line passing through the virtual camera 60' and the player object PO in the present position is set as the visual axis 64. Then, a position where a distance from the player object PO is a given value D on the visual axis 64 will be a new position of the virtual camera 60 in the same manner as in the non-battle camera control processing.

The increase of the movement amount of the virtual camera 60 is suppressed by setting the visual axis 64 as described above. Accordingly, it is possible to suppress a great change of the game image at the time of switching to the non-battle camera control processing.

For example, in the case where there is no object to be imaged and only the canceled objects exist as shown in FIG. 11A, the condition for registration as the object to be imaged differs from the above-described condition. Specifically, the condition is that the object exists in the CM circle area 82 in the former position.

When the state shown in FIG. 11A has made a transition to the state shown in FIG. 12A, the CM circle area 82 is set in the former position again. FIG. 12A shows a state where the enemy objects EO6 and EO7 have moved into the PO circle area 80. Though the enemy objects EO6 and EO7 are adjacent to each other, they are positioned in the outside of the CM circle area 82 in the former position (CM circle area 82'). Accordingly, the enemy objects EO6 and EO7 are not registered as objects to be imaged.

Accordingly, the CM circle area 82 is set in the CM circle area 82 in the former position (CM circle area 82') again. The CM circle area 82 shown in FIG. 12A corresponds to the CM circle area 82 shown in FIG. 11A. The battle camera control processing is also continued.

Even in the case where the enemy object EO2 moves into the PO circle area 80 from the state shown in FIG. 12A, the enemy object EO2 is not registered as the object to be imaged unless the object is moved into the CM circle area 82'.

Figure 12B:
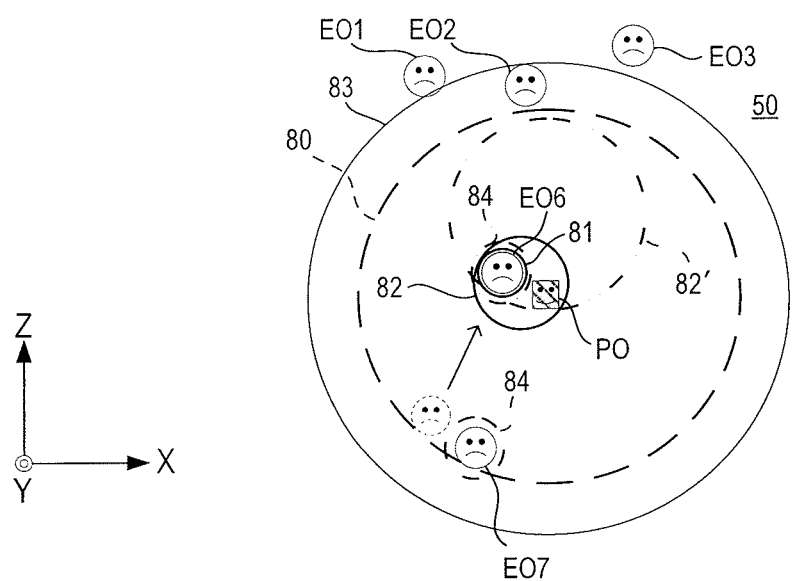
FIG. 12B is an explanatory view for explaining the transition from the battle camera control processing to the non-battle camera control processing.

Furthermore, when the state shown in FIG. 12A has made a transition to a state shown in FIG. 12B, the enemy object EGG is registered as the object to be imaged. FIG. 12B shows a state where the enemy object EO6 has moved into the CM circle area 82 in the former position (CM circle area 82'). The CM circle area 82' shown in FIG. 12B corresponds to the CM circle area 82 shown in FIG. 12A.

In this case, the enemy object EO6 is registered as the object to be imaged, though there does not exist another adjacent enemy object EO. Then, the EO circle area 81 is formed based on the position of the enemy object EO6. After that, the CM circle area 82 is formed based on the positional relationship between the EO circle area 81 and the player object PO. The battle camera control processing is also continued.

On the other hand, when the enemy object EO2 moves to the outside of the end determination area 83 from the state shown in FIG. 12A, the registration of the enemy object EO2 as the canceled object is canceled. Then, the maintained CM circle area 82 disappears and the enemy objects EO6 and EO7 existing in the PO circle area 80 are registered as objects to be imaged, then, the new EO circle area 81 and the CM circle area 82 are formed.

Next, the above-described non-battle camera control processing and the battle camera control processing will be explained with reference to flowcharts of FIG. 15 to FIG. 22A, 22B. The control unit 101 executes the non-camera control processing when a control flag=0 and executes the battle camera control processing when it is determined that the control flag=1. The control unit 101 executes the camera control processing corresponding to the value of the control flag in units of frames.

Figure 15:
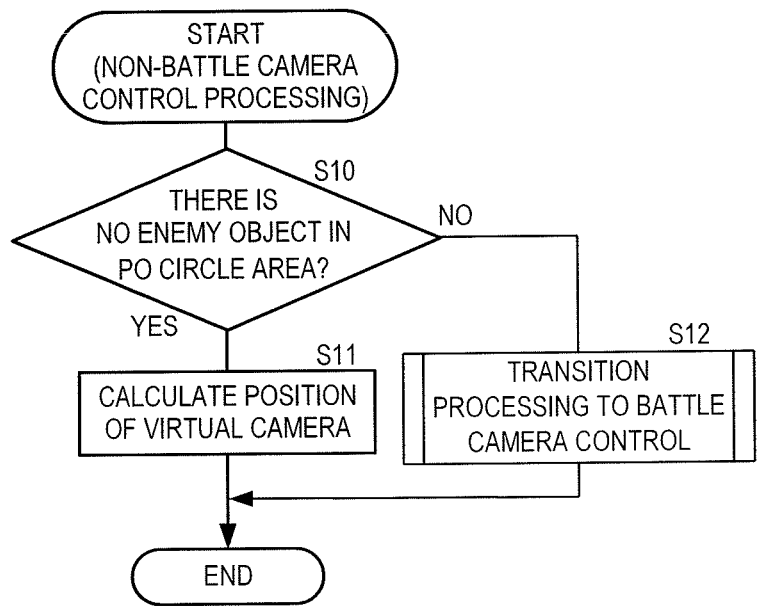
FIG. 15 is a flowchart showing the non-battle camera control processing.

FIG. 15 is a flowchart showing the non-battle camera control processing. The control unit 101 determines whether there is no enemy object EO in the PO circle area 80 first (Step S10). The control unit 101 makes determination based on, for example, positions of respective enemy objects EO existing in the game space 50 and the position of the PO circle area 80. The identification of enemy objects EO may be performed, for example, based on identification information set in the enemy objects EO.

When it is determined that there is no enemy object EO in the PO circle area 80 (Step S10: YES), the control unit 101 calculates a new position of the virtual camera 60 based on the position of the player object PO as described above (Step S11). Then, the process is ended. Because the value of the control flag is held as "0", the non-battle camera control processing is continuously executed in the next camera control processing.

On the other hand, when it is determined that an enemy object EO exists in the PO circle area 80 (Step S10: NO), the transition processing to battle camera control is executed (Step S12). At this time, the non-battle camera control processing is substantially ended. In the transition processing, the new position of the virtual camera 60 is determined as described with reference to FIGS. 4A, 4B to FIG. 6A, 6B. After that, the non-battle camera control processing is ended. The value of the control flag is changed from "0" to "1" by the transition processing. Then, the battle camera control processing is executed in the next camera control processing.

Figure 16:
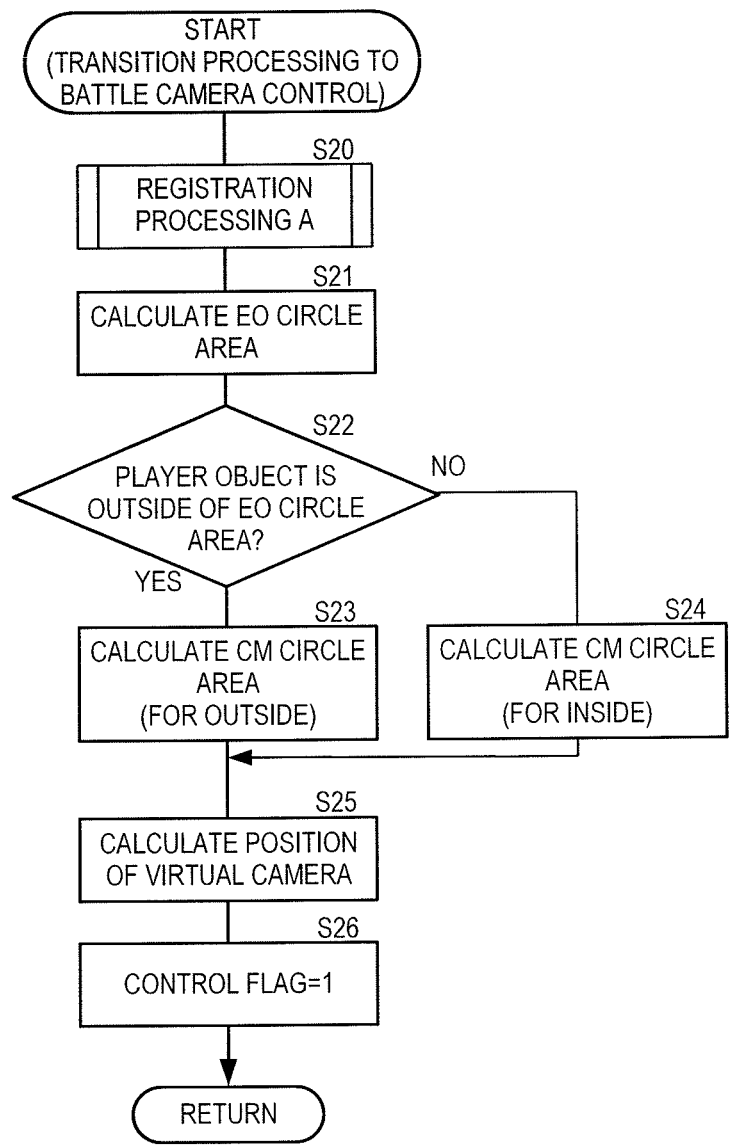
FIG. 16 is a flowchart showing transition processing to battle camera control.

FIG. 16 is a flowchart showing the transition processing to battle camera control executed in Step S12 of FIG. 15. First, the control unit 101 executes registration processing A (Step S20). The registration processing A is processing for registering at least one enemy object EO in the PO circle area 80 as a new object to be imaged. The details will be described later.

Next, the control unit 101 calculates the EO circle area 81 based on the position of the object to be imaged registered in Step S20 (Step S21). Then, the control unit 101 determines whether the player object PO is positioned in the outside of the EO circle area 81 or not (Step S22).

When it is determined that the player object is positioned in the outside (Step S22: Yes), the control unit 101 performs calculation of the CM circle area 82 for the outside (Step S23). That is, the calculation of the CM circle area 82 in the case where the player object PO is positioned in the outside of the EO circle area 81 is performed.

On the other hand, it is determined that the player object PO is not positioned in the outside (Step S22: NO), the control unit 101 performs calculation of the CM circuit area 82 for the inside (Step S24). That is, the calculation of the CM circle area 82 in the case where the player object PO is positioned in the inside of the EO circle area 81 is performed.

Then, the control unit 101 calculates a new position of the virtual camera 60 based on the calculated CM circle area 82 (Step S25). After that, the control unit 101 changes the setting of the control flag from "0" to "1" (Step S26) and ends the process.

In the process of Step S25, the straight line in which the angle β is a given value (for example, 30 degrees) is set as the visual axis 64 when the angle β is 0 degrees or 90 degrees as explained by using FIG. 5B. Then, the new position of the virtual camera 60 is calculated based on the visual axis 64 and so on.

Figure 21:
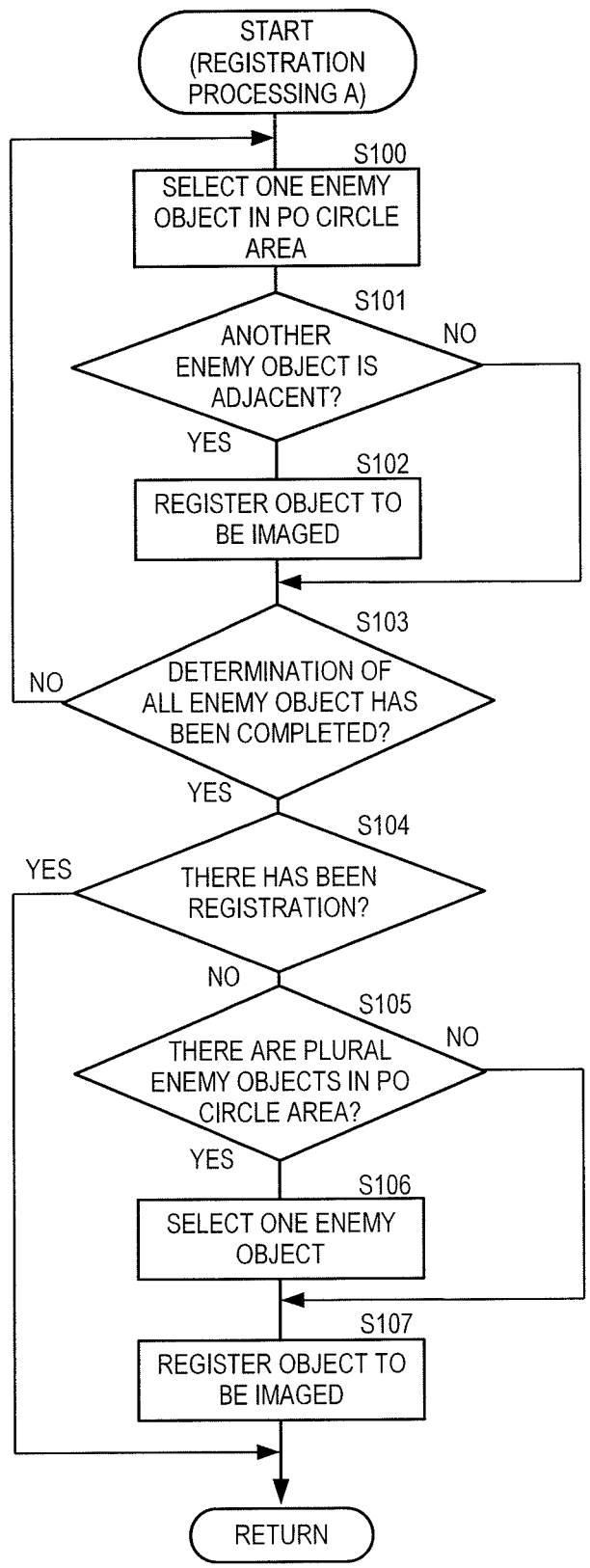
FIG. 21 is a flowchart showing registration processing A.

Next, the registration processing A executed in the process of Step S20 will be explained. FIG. 21 is a flowchart showing the registration processing A. The registration processing A is the processing for registering at least one enemy object EO in the PO circle area 80 as the new object to be imaged as described above.

The control unit 101 selects one enemy object EO which has not been registered until now as the object to be imaged in the PO circle area 80 (Step S100).

Next, the control unit 101 determines whether the selected enemy object EO is adjacent to another enemy object EO or not (Step S101). The adjacent circle areas 84 are used for determination as described above. When it is determined that the enemy object EO is adjacent to another enemy object EO (Step S101: YES), the control unit 101 registered the enemy object EO as the object to be imaged (Step S102). For example, identification information of the enemy object EO is stored in a storage area for the objects to be imaged of the RAM 102. After that, the control unit 101 proceeds with a process of Step S103.

On the other hand, when it is determined that the enemy object is not adjacent to another enemy object EO (Step S101: NO), the control unit 101 does not register the enemy object as the object to be imaged and proceeds with the process of Step S103. Then, the control unit 101 executes the above processing (Step S101 to S102) repeatedly until it is determined that the above processing has been executed to all the enemy objects EO in the PO circle area 80 in the process of Step S103.

When the above processing is completed with respect to all the enemy objects EO (Step S103: YES), the control unit 101 determines whether there has been the registration of the object to be imaged or not (Step S104). This will be a determination process for executing exceptional processing continued from Step S105 when only the enemy object EO which is not adjacent to another enemy object EO exists in the PO circle area 82.

When it is determined that there has been the registration (Step S104: YES), the control unit 101 ends the process. For example, in the case where the objects to be imaged have been registered in the state where the enemy objects EO are adjacent to each other as shown in FIG. 5B, exceptional processing continued from Step S105 is not necessary and the process ends.

On the other hand, when it is determined that there has not been registration of the object to be imaged (Step S104: NO), the control unit 101 performs processing continued from Step S105 as the exceptional processing is necessary. For example, in the case where only one enemy object EO2 exists in the PO circle area 80 as shown in FIG. 4A, it is necessary to register at least the enemy object EO2 as the object to be imaged, it is determined that the exceptional processing continued from Step S105 is necessary.

Next, the control unit 101 determines whether plural enemy objects EO exist or not in the PO circle area 80 in the process of Step S105. When it is determined that plural enemy objects EO exist (Step S105: YES), the control unit 101 selects one object from the plural enemy objects EO (Step S106). As described above, the enemy object EO may be selected at random or the enemy object EO closest to the player object PO may be selected. Then, the control unit 101 registers the selected one enemy object EO as the object to be imaged (Step S107) and ends the process.

On the other hand, when it is determined that there is only one enemy object (Step S105: NO), the control unit 101 registers the enemy objet EO as the object to be imaged (S107) and ends the process.

As described above, at least one enemy object EO is registered as the object to be imaged in the registration processing A.

Figure 17A:
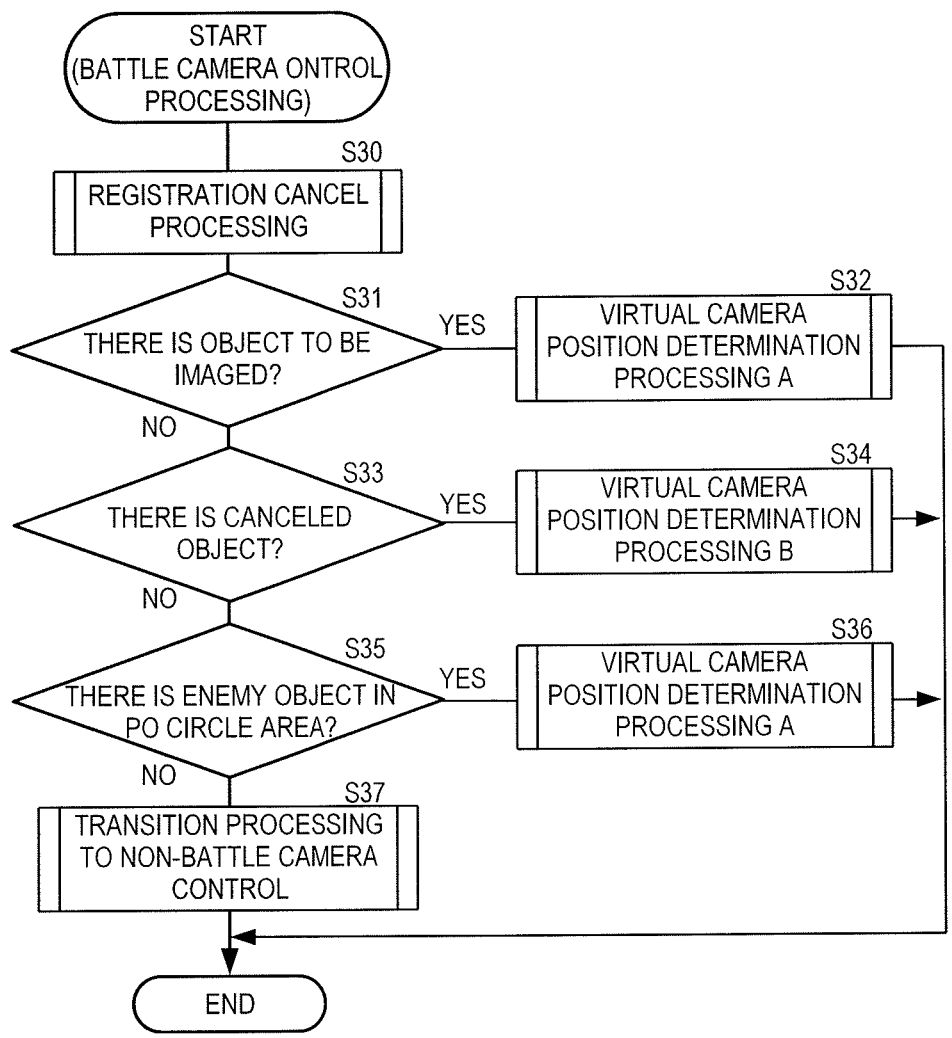
FIG. 17A is a flowchart showing the battle camera control processing.

Next, the battle camera control processing will be explained. FIG. 17A is a flowchart showing the battle camera control processing. The control unit 101 executes registration cancel processing first (Step S30). In the registration cancel processing, registration cancel of objects to be imaged and canceled objects which have already been registered is performed. After that, the control unit 101 executes any of processing of determining the position of the virtual camera 60 (Step S32, S34 and S36) and the transition processing to non-battle camera control (Step S37) in accordance with the status of enemy objects EO.

Here, the registration cancel processing of Step S30 will be explained. FIG. 18 is a flowchart showing registration cancel processing. First, the control unit 101 starts the registration cancel processing of the objects to be imaged. The control unit 101 selects one of the objects to be imaged (Step S50), determining whether the object to be imaged exists in the PO circle area 80 or not (Step S51).

When it is determined that the object exists in the PO circle area 80 (Step S51: YES), it is determined that the registration of the object to be imaged is held and the control unit 101 proceeds with the process of Step S55. On the other hand, when it is determined that the object does not exist in the PO circle area 80 (Step S51: NO), the control unit 101 cancels the registration of the enemy object EO as the object to be imaged (Step S52).

After that, the control unit 101 determines whether the enemy object EO in which the registration as the object to be imaged has been canceled exists in the end determination area 83 or not (Step S53). Then, when it is determined that the object exists in the end determination area 83 (Step S53: YES), the control unit 101 registers the enemy object EO as the canceled object (Step S54). For example, identification information of the enemy object EO is stored in a storage area for the canceled object on the RAM 102.

On the other hand, when it is determined that the object does not exist in the end determination area 83 (Step S53:NO), the control unit 101 does not register the enemy object EO as the canceled object and proceeds with the process of Step S55. After that, the control unit 101 executes the above processing (Step S51 to S54) repeatedly until it is determined that the above processing has been executed to all the objects to be imaged in the process of Step S55.

For example, in the above FIG. 11A, the registration of the enemy objects EO1 and EO3 as objects to be imaged which have moved to the outside of the PO circle area 80 and the end determination area 83 is canceled, and they are not registered as canceled objects either. The registration of the enemy object EC2 is canceled, which is positioned in the inside of the end determination area 83 though it has moved to the outside of the PO circle area 80, however, it is registered as the canceled object.

After that, when the processing with respect to all the objects to be imaged is completed (Step S55: YES), the control unit 101 executes registration cancel processing of the canceled object. First, the control unit 101 selects one canceled object which has already been registered (S56), determining whether the canceled object is positioned in the end determination area 83 or not (Step S57).

When it is determined that the canceled object exists in the end determination area 83 (Step S57: YES), the control unit 101 proceeds with the process of Step S59 as the registration of the canceled object is held. On the other hand, when it is determined that the canceled object does not exist in the end determination area 83 (Step S57: NO), the control unit 101 cancels the registration of the enemy object EO as the canceled object (Step S58) and proceeds with the process of Step S59. For example, because the enemy object EO2 as the canceled object has moved to the outside of the end determination area 83 in the above FIG. 11B, the registration as the canceled object is canceled.

After that, the control unit 101 executes the above processing (Step S57 and S58) repeatedly until it is determined that the above processing has been executed to all the canceled objects in the process of Step S59. When the processing with respect to all the canceled objects has been completed (Step S59: YES), the control unit 101 ends the registration cancel processing.

Next, the process returns to FIG. 17A and processing continued from Step S31 will be explained. The control unit 101 determines whether there is a object to be imaged or not in the process of Step S31. Here, the reason why whether there is an object to be imaged or not is determined is that subsequent processing of determining the position of the virtual camera 60 differs according to the presence of the object to be imaged as shown in FIGS. 10A, 10B to FIGS. 12A, 12B.

When it is determined that there is the object to be imaged (Step S31: YES), the control unit 101 executes camera position determination processing A (Step S32) to determine a new position of the virtual camera 60. After that, the control unit 101 ends the battle camera control processing. The camera position determination processing A will be described later.

On the other hand, when it is determined that there is no object to be imaged (Step S31: NO), the control unit 101 determines whether there is a registered canceled object or not (Step S33). Here, the reason why whether there is a canceled object or not is determined is that subsequent processing of determining the position of the virtual camera 60 differs according to the presence of the canceled object as shown in FIGS. 11A, 11B and FIGS. 12A, 12B.

When it is determined that there is the registered object (Step S33: YES), the control unit 101 executes camera position determination processing B (Step S34) to determine a new position of the virtual camera 60.

The above case corresponds to, for example, the state where there exists the enemy object EO2 in which registration as the object to be imaged has been canceled and which is registered as the canceled object as shown in FIG. 11A. After that, the control unit 101 ends the battle camera control processing. The camera position determination processing B will be described later.

On the other hand, when it is determined that there is no registered canceled object (Step S33: NO), the control unit 101 determines whether there is an enemy object EO in the PO circle area 80 or not (Step S35). When it is determined that there is an enemy object EO in the PO circle area 80 (Step S35: YES), the control unit 101 executes the camera position determination processing A (Step S36) to determine a new position of the virtual camera 60.

The above case corresponds to, for example, the state where neither the object to be imaged nor the canceled object which has already been registered exists but an enemy object EO which has not been registered as the object to be imaged exists in the PO circle area 80. After that, the control unit 101 ends the battle camera control processing.

On the other hand, when it is determined that there is no enemy object EO in the PO circle area (Step S35: NO), the control unit 101 performs the transition processing to non-battle camera control (Step S37), determining a new position of the virtual camera 60.

The above case corresponds to, for example, the state where neither the object to be imaged nor the canceled object exists, and no other enemy object EO exists in the PO circle area 80 as shown in FIG. 11B. That is, the case corresponds to the state where there is no enemy object EO around the player object PO. The value of the control flag is changed from "1" to "0" by the transition processing. After that, the control unit 101 ends the battle camera control processing and executes the non-battle camera control processing in the next camera control processing.

Figure 17B:
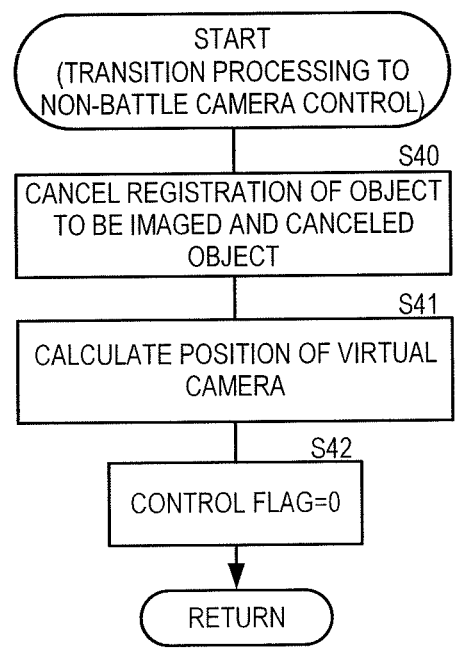
FIG. 17B is a flowchart showing transition processing to non-battle camera control.

Here, the transition processing to non-battle camera control executed in the process of Step S37 will be explained. FIG. 17B is a flowchart showing transition processing to non-battle camera control. First, the control unit 101 cancels registration of all the objects to be imaged and the canceled objects (Step S40).

Next, the control unit 101 calculates a new position of the virtual camera 60 (Step S41). For example, the position of the virtual camera 60 is calculated based on the position of the player object PO in the manner as explained in the above FIG. 11B. Then, the control unit 101 changes the setting of the control flag from "1" to "0" (Step S42) and ends the transition processing.

Figure 19:
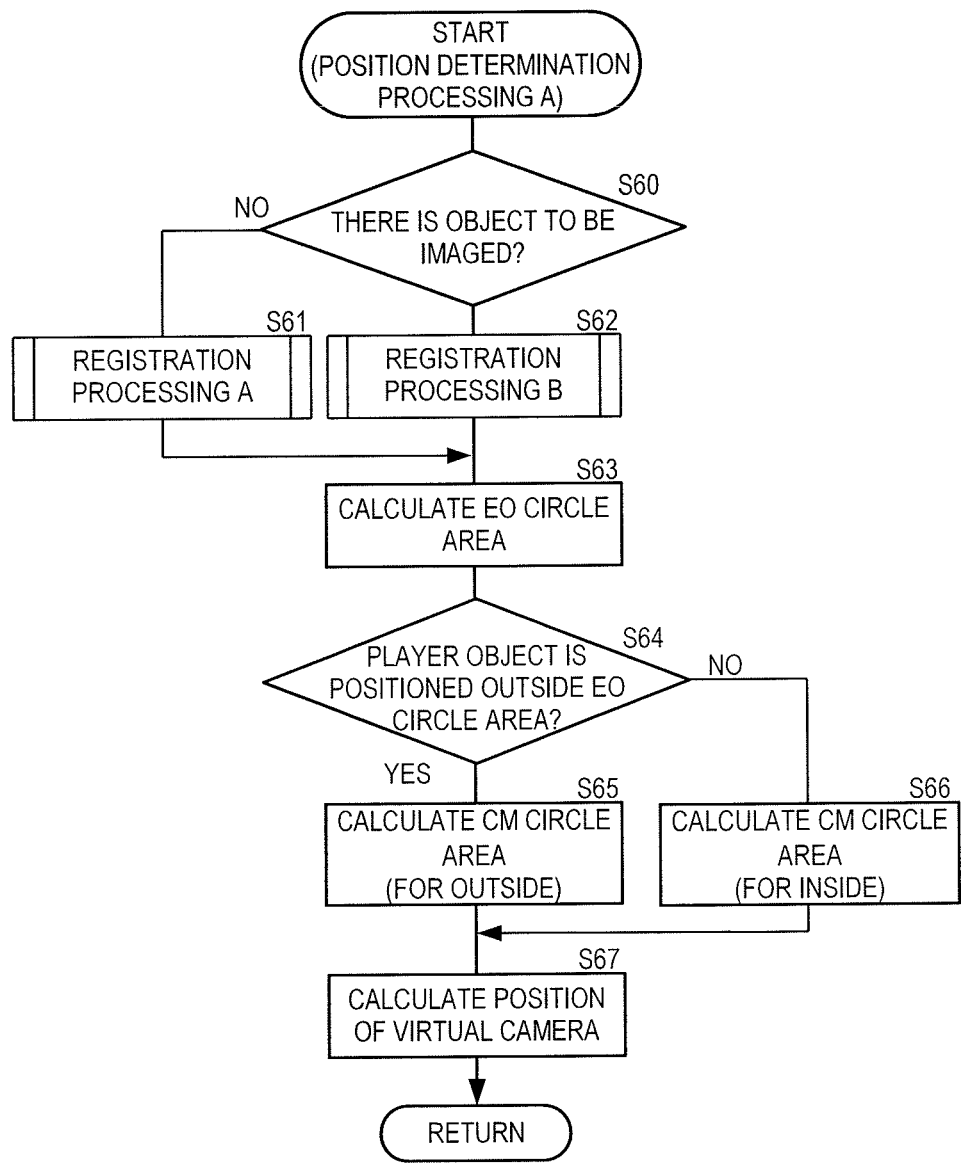
FIG. 19 is a flowchart showing position determination processing A.

Next, the camera position determination processing A executed in Step S32 and S36 of FIG. 17A will be explained. FIG. 19 is a flowchart showing the camera position determination processing A. First, the control unit 101 determines whether there is an object to be imaged which has already been registered or not (Step S60). The condition in which the enemy object is registered as a new object to be imaged differs according to the above determination. When it is determined that there is no object to be imaged (Step S60: NO), the control unit 101 executes the registration processing A (Step S61) and proceeds with the process of Step S63. The process corresponds to the case executed in Step S36 shown in FIG. 17A.

The registration processing A is processing for registering at least one enemy object EO in the PO circle area 80 as the new object to be imaged. As the registration processing A is the same as the processing executed in Step S20 in the transition processing to battle camera control shown in FIG. 16, the explanation is omitted.

On the other hand, when it is determined that there is a object to be imaged (Step S60: YES), the control unit 101 executes registration processing B (Step S62). The process corresponds to the case executed in Step S32 shown in FIG. 17A. In the registration processing B, only adjacent enemy objects EC are newly registered as the objects to be imaged as explained in the above FIG. 9A. The details of the registration processing B will be explained later.

In the registration processing A and B, unregistered enemy objects EC are targeted as objects to be imaged at the time of executing these processing.

The unregistered enemy objects EO are registered as new objects to be imaged by the registration processing A and B, and update of the object to be imaged which have already been registered is performed in the registration cancel processing of Step S30 shown in FIG. 17A. Accordingly, the update of the registration status of the objects to be imaged is completed by these processing.

After that, the control unit 101 calculates the EO circle area 81 based on the position of the object to be imaged (Step S63). Then, the control unit 101 determines whether the player object PO is positioned in the outside of the EO circle area 81 or not (Step S64). When it is determined that the player object PO is positioned in the outside (Step S64: YES), the control unit 101 calculates the CM circle area 82 for the outside (Step S65). On the other hand, when it is determined that the player object PO is not positioned in the outside (Step S64: NO), the control unit 101 performs calculation of the CM circle area 82 for the inside (Step S66). The processing of Step S63 to S66 is the same as the processing of Step S21 to S24 shown in FIG. 16.

Then, the control unit 101 calculates a new position of the virtual camera 60 based on the calculated CM circle area (Step S67) and ends the camera position determination processing A. In the processing of Step S67, the new position of the virtual camera 60 is calculated as explained with reference to FIGS. 7A and 7B, which differs from the processing of Step S25 shown in FIG. 16.

Figure 22A:
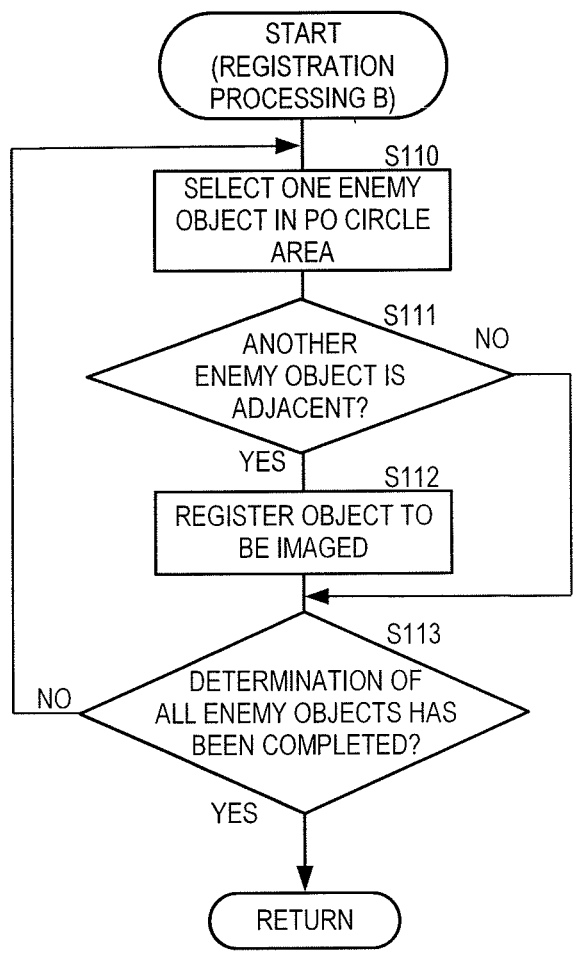
FIG. 22A is a flowchart showing registration processing B.

Next, the registration processing B executed in Step S62 will be explained. FIG. 22A is a flowchart showing the registration processing B. The registration processing B is the same as the processing of Step S100 to S103 of the registration processing A shown in FIG. 21, in which only adjacent enemy objects are registered as new objects to be imaged. The control unit 101 selects one enemy object EO which has not been registered until now as the object to be imaged in the PO circle area 80 (Step S110).

Next, the control unit 101 determines whether the selected enemy object EO is adjacent to another enemy object EO or not (Step S111). When it is determined that the selected enemy object is adjacent to another enemy objet EO (Step S111: YES), the control unit 101 registers the enemy object EO as a new object to be imaged (Step S112) and proceeds with the process of Step S113.

On the other hand, when it is determined that the object is not adjacent to another enemy object EO (Step S111: NO), the control unit 101 determines that the object is not registered as the object to be imaged and proceeds with the process of Step S113. Then, the control unit 101 executes the above processing (Step S111 and S112) repeatedly until it is determined that the above processing has been executed to all the unregistered enemy objects EO in the PO circle area 80 in the process of Step S113. Then, when the above processing with respect to all the enemy objects has been completed (Step S113: YES), the control unit 101 ends the registration processing B.

Figure 20:
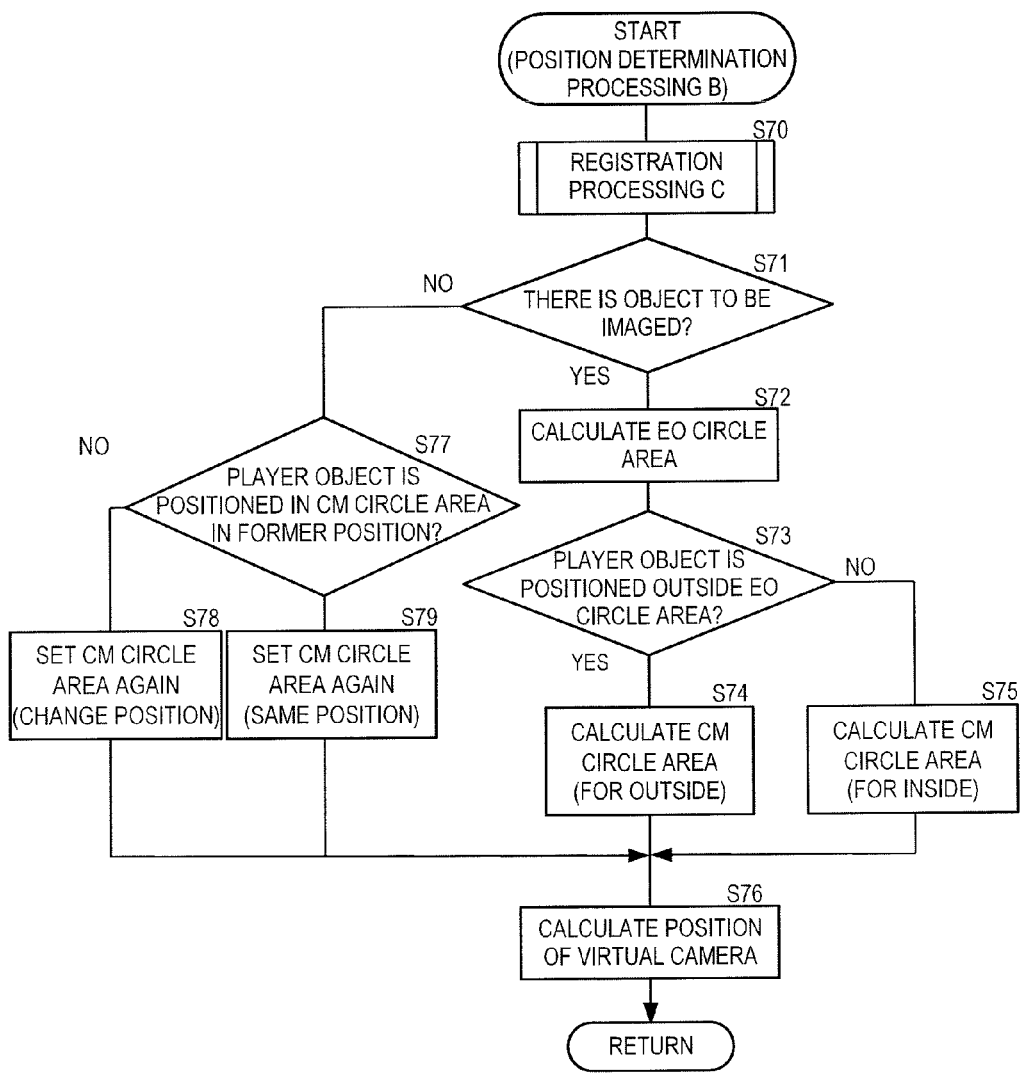
FIG. 20 is a flowchart showing position determination processing B.

Next, the camera position determination processing B executed in Step S34 of FIG. 17A will be explained. FIG. 20 is a flowchart showing the camera position determination processing B. In the camera position determination processing B, a new position of the virtual camera 60 in the state where the enemy object 50 registered as the canceled object exists is determined as explained with reference to FIGS. 11A, 12A, 12B, 13A and 13B.

The control unit 101 performs registration processing C first (Step S70). The registration processing C is processing for registering the enemy object EO as a new object to be imaged in the same manner as the registration processing A and B. However, in the registration processing C, the condition in which the new object to be imaged is registered differs from the registration processing A and B. The condition is that the enemy object EO is positioned in the CM circle area 82 in the former position as shown in FIG. 12B. The details of the registration processing C will be described later.

Next, the control unit 101 determines whether there is an object to be imaged or not (Step S71). When it is determined that there is the object to be imaged (Step S71:YES), the control unit 101 executes the same processing (Step S72 to S76) as the processing of Step S63 to S67 of the camera position determination processing A of FIG. 19. For example, the processing corresponds to the case where the enemy object EO6 registered as the new object to be imaged exists as shown in FIG. 12B. After that, the control unit 101 ends the camera position determination processing B.

On the other hand, when it is determined that there is no object to be imaged (Step S71: NO), the control unit 101 determines whether the player object PO is positioned in the CM circle area 82 in the former position (Step S77).

When it is determined that the player object PO is positioned in the CM circle area 82 in the former position (Step S77: YES), the CM circle area 82 in the former position is set again as a new CM circle area 82 (Step S79). For example, the setting corresponds to the case shown FIG. 12A. The setting also corresponds to the case where the player object PO is moved into the inside of the CM circle area 82 in the former position as shown in FIG. 13A. After that, the control unit 101 proceeds with the process of Step S76.

On the other hand, when it is determined that the player object PO is positioned in the outside of the CM circle area 82 in the former position (Step S77: NO), the control unit 101 calculates a new position based on the movement direction, the movement amount and the like of the player object PO, setting the CM circle area 82 in the same shape as the CM circle area 82 in the former position (Step S78). For example, the setting corresponds to the case shown in FIG. 12B. After that, the control unit 101 proceeds with the process of Step S76.

Then, the control unit 101 calculates a new position of the virtual camera 60 based on the CM circle area 82 which has been set again and so on (Step S76) and ends the camera position determination processing B.

Next, the registration processing C executed in Step S70 will be explained. FIG. 22B is a flowchart showing the registration processing C. In the registration processing C, the enemy object EO existing in the CM circle area 82 in the former position among the enemy objects in the PO circle area 80 is registered as the object to be imaged.

First, the control unit 101 selects one enemy object EO which has not been registered until now as the object to be imaged in the PO circle area 80 (Step S120). Then, the control unit 101 determines whether the selected enemy object 50 is positioned in the CM circle area 82 in the former position or not (Step S121).

When it is determined that the selected enemy object is positioned (Step S121: YES), the control unit 101 registers the enemy object EO as a new object to be imaged (Step S122) and proceeds with the process of Step S123. For example, the process corresponds to the case shown in FIG. 12B.

On the other hand, when it is determined that the object is not positioned (Step S121: NO), the process proceeds to Step S123. For example, the process corresponds to the case shown in FIG. 12A.

Then, the control unit 101 executes the above processing (Step S122 and S122) repeatedly until it is determined that the above processing has been executed to all the unregistered enemy objects EO in the PO circle area 80 (Step S123). After that, when it is determined that the above processing has been executed to all the enemy objects PO (Step S123: YES), the control unit 101 ends the registration processing C.

As described above, the position of the virtual camera 60 is controlled based on the positional relationship between the player object PO and plural enemy objects EO different from the player object PO. Accordingly, the player object PO and plural enemy objects EO are suitably included in the game image. Therefore, it is possible to improve visibility of the game image with respect to the user even in a three dimensional virtual space including the player object PO and plural enemy objects EO.

In particular, the position of the virtual camera 60 is determined by using the areas corresponding to the positions of respective enemy objects EO as objects to be imaged, therefore, it is possible to suppress the increase of variation of the position of the virtual camera 60 (visual point 62) due to the movement of the enemy objects EO. Therefore, it is possible to suppress a sudden change of the contents of the game image, which allows the user to visually recognize the game image easily.

Though the respective areas 80 to 84 in the embodiment have the circle shape, the present invention is not particularly limited to this. Any shape can be applied.

In the embodiment, the position of the virtual camera 60 is determined based on the positional relationship between the player object PO and plural enemy objects EO different from the player object PO, however, the present invention is not particularly limited to the enemy objects EO. For example, plural friend objects which are friends of the player object PO can be used.

Moreover, the present invention is not limited to the same type of object such as the enemy object EO and so on. For example, the position of the virtual camera 60 may be determined based on the positional relationship between the player object PO and plural enemy objects as well as friend objects. In this case, a circle area corresponding to the EO circle area 81 may be formed based on positions of plural enemy objects and friend objects.

Furthermore, plural enemy objects EO are so-called non-player objects the operation of which is controlled by the control unit 101, however, the present invention is not limited to the non-player objects. For example, it is also preferable to apply a configuration in which the enemy object EO is operated by another user different from the user operating the player object PO. The configuration corresponds to a game and so on, in which the user battles with another user.

In this case, a video game device 10B of another user is connected to a video game device 10A of the user so as to be communicated with each other through the network line 2. Then, a common game space is realized by performing transmission/reception of game data and so on between the video game devices 10A and 10B. Another user can operate the enemy object EO of himself/herself by using the operation unit 38 connected to the video game device 10B of himself/herself. The above friend objects can be used in the same manner.

Also in the embodiment, the non-battle camera control processing and the battle camera control processing are alternatively executed, however, only the battle camera control processing may be executed in a game in which enemy objects constantly appear.

In the above explanation, the video game device 10 is cited as an example of the image processing device according to the invention, however, the present invention can be applied also to a personal computer, a smart phone, a tablet terminal and so on.

Additionally, the present invention can be also applied to a case of a configuration including a server device and a client terminal connected by the network line such as Internet. For example, there is a configuration in which the server device performs execution processing of the game and the client terminal receives data and so on from the server device to display the game image. In this case, the server device corresponds to an image processing device.

The present invention is not limited to the image processing device realizing the three dimensional virtual space of the video game. For example, the present invention can be also applied to an image processing device which generates a three dimensional virtual space different from a video game, in which an avatar and so on possessed by a user makes action to interact with other avatars or to purchase virtual items at virtual shops and so on.

What is claimed is:

1. A non-transitory computer-readable medium including an image processing program which is executable by a computer device for causing the computer device to function as an image processing device generating a two dimensional image of at least part of a three dimensional virtual space imaged by a virtual camera and to function as:
a virtual camera controller for controlling a movement of the virtual camera in the three dimensional virtual space;
an object controller for generating a player object operated by a user through an operation controller and plural objects different from the player object in the three dimensional virtual space, and controlling a motion of the player object and the plural objects; and
a graphics processor for generating an image taken by the virtual camera as the two dimensional image,
wherein the virtual camera controller selects enemy objects existing within a given range of the player object from among the plural objects,
when the virtual camera controller selects a plurality of enemy objects existing within the given range of the player object, the virtual camera controller determines an enemy object area including the plurality of enemy objects, and determines a center point of the enemy object area,
the virtual camera controller determines a position of the virtual camera based on a positional relationship between the player object and the plurality of enemy objects so that the player object and the plurality of enemy objects are captured into the two dimensional image, the positional relationship between the player object and the plurality of enemy objects being defined by a segment which includes a player object position of the player object and the center point of the enemy object area including the plurality of enemy objects, and
the virtual camera controller differently determines the segment depending on whether the player object position is within the enemy object area.

2. The non-transitory computer-readable medium according to claim 1,
wherein the virtual camera controller determines the enemy object area including the plurality of enemy objects based on a respective position of each of the plurality of enemy objects.

3. The non-transitory computer-readable medium according to claim 2,
wherein the virtual camera controller determines a player object area including the player object and the enemy object area based on the positional relationship between the player object and the enemy object area, and determines the position of the virtual camera so that the player object area is captured into the two dimensional image by setting a center of the player object area as a point of gaze.

4. The non-transitory computer-readable medium according to claim 1,
wherein the virtual camera controller selects the enemy objects which are positioned within a given distance from the player object as the plurality of enemy objects.

5. The non-transitory computer-readable medium according to claim 1,
wherein the virtual camera controller, when an enemy object of the plurality of enemy objects is moved out of the given range, a selection of the enemy object is canceled.

6. An image processing device generating a two dimensional image of at least part of a three dimensional virtual space imaged by a virtual camera, comprising:
a virtual camera controller for controlling a movement of the virtual camera in the three dimensional virtual space;
an object controller for generating a player object operated by a user through an operation controller and plural objects different from the player object in the three dimensional virtual space, and controlling a motion of the player object and the plural objects; and
a graphics processor for generating an image taken by the virtual camera as the two dimensional image,
wherein the virtual camera controller selects enemy objects existing within a given range of the player object from among the plural objects,
when the virtual camera controller selects a plurality of enemy objects existing within the given range of the player object, the virtual camera controller determines an enemy object area including the plurality of enemy objects, and determines a center point of the enemy object area,
the virtual camera controller determines a position of the virtual camera based on a positional relationship between the player object and the plurality of enemy objects so that the player object and the plurality of enemy objects are captured into the two dimensional image, the positional relationship between the player object and the plurality of enemy objects being defined by a segment which includes a player object position of the player object and the center point of the enemy object area including the plurality of enemy objects, and
the virtual camera controller differently determines the segment depending on whether the player object position is within the enemy object area.

7. An image processing method executed by an image processing device generating a two dimensional image of at least part of a three dimensional virtual space imaged by a virtual camera, comprising:
controlling a movement of the virtual camera in the three dimensional virtual space;
generating a player object operated by a user through an operation controller and plural objects different from the player object in the three dimensional virtual space, and controlling a motion of the player object and the plural objects; and
generating an image taken by the virtual camera as the two dimensional image,
wherein enemy objects existing within a given range of the player object from among the plural objects are selected,
when the virtual camera controller selects a plurality of enemy objects existing within the given range of the player object, an enemy object area including the plurality of enemy objects is determined, and a center point of the enemy object area is further determined, a position of the virtual camera is determined based on a positional relationship between the player object and the plurality of enemy objects so that the player object and the plurality of enemy objects are captured into the two dimensional image in the controlling of the movement of the virtual camera, the positional relationship between the player object and the plurality of enemy objects being defined by a segment which includes a player object position of the player object and the center point of the enemy object area including the plurality of enemy objects, and the segment is differently determined depending on whether the player object position is within the enemy object area.

8. The non-transitory computer-readable medium according to claim 1, wherein, when the player object position of the player object is outside the enemy object area, the player object position of the player object is a first end point of the segment and an intersection point of the segment and the enemy object area is a second endpoint of the segment, and when the player object position is inside the enemy object area, end points of the segment are intersection points of the segment and the enemy object area.

9. The non-transitory computer-readable medium according to claim 1, wherein the virtual camera controller determines whether an area of each of the enemy objects existing within the given range of the player object overlaps, and an area of an enemy object which does not overlap the area of any other enemy object is not registered as the plurality of enemy objects.

10. The non-transitory computer-readable medium according to claim 1, wherein, when two of the enemy objects existing within the given range of the player object are not adjacent each other, the virtual camera controller registers one of the two of the enemy objects as the plurality of enemy objects at random.

11. The image processing device according to claim 6, wherein, when the player object position of the player object is outside the enemy object area, the player object position of the player object is a first end point of the segment and an intersection point of the segment and the enemy object area is a second endpoint of the segment, and when the player object position is inside the enemy object area, end points of the segment are intersection points of the segment and the enemy object area.

12. The image processing device according to claim 6, wherein the virtual camera controller determines whether an area of each of the enemy objects existing within the given range of the player object overlaps, and an area of an enemy object which does not overlap the area of any other enemy object is not registered as the plurality of enemy objects.

13. The image processing device according to claim 6, wherein, when two of the enemy objects existing within the given range of the player object are not adjacent each other, the virtual camera controller registers one of the two of the enemy objects as the plurality of enemy objects at random.

14. The image processing method according to claim 7, wherein, when the player object position of the player object is outside the enemy object area, the player object position of the player object is a first end point of the segment and an intersection point of the segment and the enemy object area is a second endpoint of the segment, and when the player object position is inside the enemy object area, end points of the segment are intersection points of the segment and the enemy object area.

15. The image processing method according to claim 7, wherein whether an area of each of the enemy objects existing within the given range of the player object overlaps is determined, and an area of an enemy object which does not overlap the area of any other enemy object is not registered as the plurality of enemy objects.

16. The image processing method according to claim 7, wherein, when two of the enemy objects existing within the given range of the player object are not adjacent each other, the virtual camera controller registers one of the two of the enemy objects as the plurality of enemy objects at random.

* * * * *